(12) United States Patent
Shimazawa et al.

(10) Patent No.: US 7,773,342 B2
(45) Date of Patent: Aug. 10, 2010

(54) THIN-FILM MAGNETIC HEAD HAVING NEAR-FIELD-LIGHT-GENERATING PORTION WITH TRAPEZOIDAL END

(75) Inventors: Koji Shimazawa, Chuo-ku (JP); Katsumichi Tagami, Chuo-ku (JP)

(73) Assignee: TDK Corporation, Tokyo (JP)

( * ) Notice: Subject to any disclaimer, the term of this patent is extended or adjusted under 35 U.S.C. 154(b) by 867 days.

(21) Appl. No.: 11/698,145

(22) Filed: Jan. 26, 2007

(65) Prior Publication Data
US 2007/0177302 A1 Aug. 2, 2007

(30) Foreign Application Priority Data
Jan. 30, 2006 (JP) .............................. 2006-020441
Feb. 2, 2006 (JP) .............................. 2006-025387

(51) Int. Cl.
*G11B 5/39* (2006.01)
(52) U.S. Cl. ..................................................... 360/126
(58) Field of Classification Search ........................ None
See application file for complete search history.

(56) References Cited

U.S. PATENT DOCUMENTS

| 6,044,056 | A | 3/2000 | Wilde et al. | |
|---|---|---|---|---|
| 6,636,460 | B2 * | 10/2003 | Akiyama et al. | 369/13.14 |
| 6,674,594 | B1 | 1/2004 | Wakabayashi et al. | |
| 6,809,908 | B1 * | 10/2004 | Ito et al. | 360/317 |
| 6,982,844 | B2 * | 1/2006 | Rettner et al. | 360/59 |
| 7,034,277 | B2 * | 4/2006 | Oumi et al. | 250/216 |
| 7,042,810 | B2 * | 5/2006 | Akiyama et al. | 369/13.33 |

FOREIGN PATENT DOCUMENTS

| JP | 10-162444 | 6/1998 |
|---|---|---|
| JP | 2000-173093 | 6/2000 |
| JP | 2001-255254 | 9/2001 |
| JP | 2003-006803 A | 1/2003 |

(Continued)

OTHER PUBLICATIONS

Shintaro Miyanishi et al., "Near-Field Assisted Magnetic Recording", IEEE Transactions on Magnetics, vol. 41, No. 10, pp. 2817-2821, Oct. 2005.

(Continued)

*Primary Examiner*—Mark Blouin
(74) *Attorney, Agent, or Firm*—Frommer Lawrence & Haug, LLP

(57) ABSTRACT

A thin-film magnetic head for a heat-assisted magnetic recording which can perform a reliable writing immediately only on a desired track by applying a near-field light to a desired position and range is provided. The head comprises: an electromagnetic coil element for writing data signals, having a pole end reaching a head end surface; and a near-field-light-generating portion for heating a portion of a magnetic recording medium during write operation by generating a near-field light, having a generation end reaching the head end surface and provided adjacent to the pole end and in the leading side of the pole end, and a shape of the generation end on the head end surface being a trapezoid with a shorter edge on the trailing side, or being a triangle with an apex on the trailing side and with a bottom on the leading side.

31 Claims, 14 Drawing Sheets

FOREIGN PATENT DOCUMENTS

| | | |
|---|---|---|
| JP | 2003-149694 A | 5/2003 |
| JP | 2004-151046 A | 5/2004 |
| JP | 2004-158067 | 6/2004 |
| JP | 2005-190518 | 7/2005 |
| JP | 2005-243124 | 9/2005 |

OTHER PUBLICATIONS

K. Shono et al., "Review of Thermally Assisted Magnetic Recording", Journal of the Magnetics Society of Japan, vol. 29, No. 1, pp. 5-13, 2005.

U.S. Appl. No. 11/604,225, filed Nov. 27, 2006.

* cited by examiner

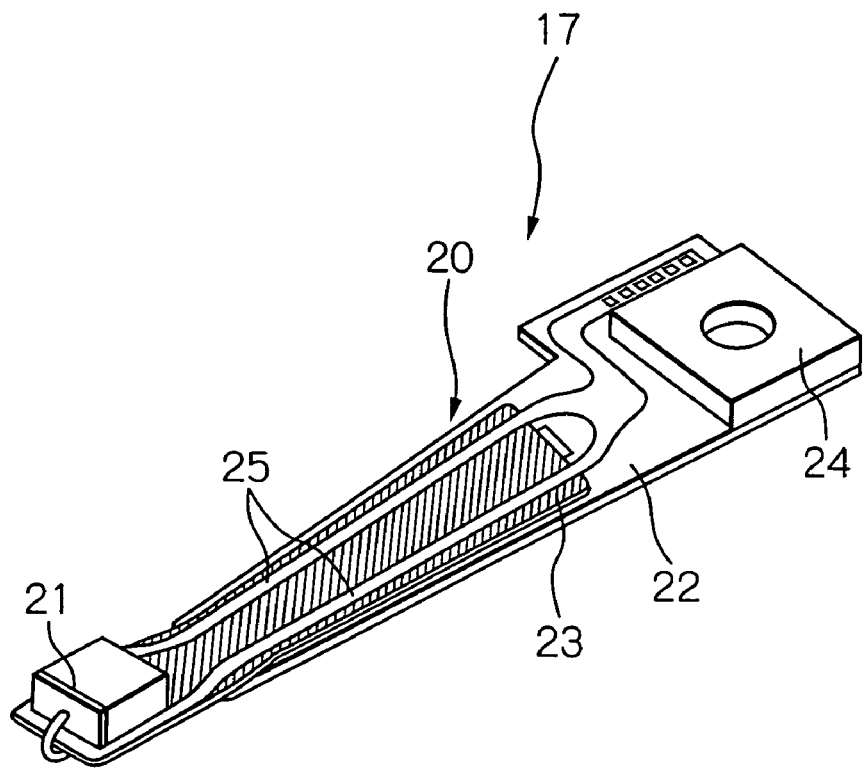
Fig. 2a1
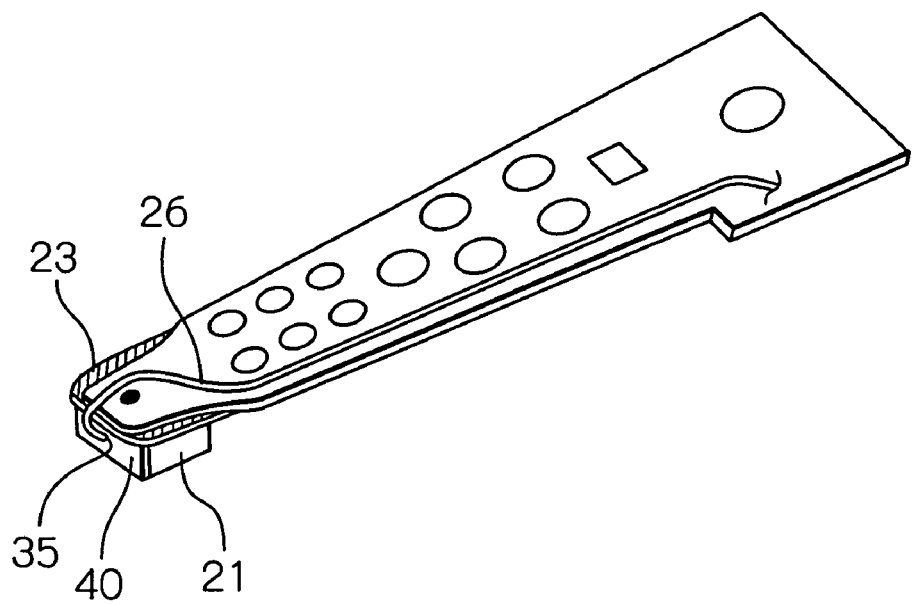
Fig. 2a2

Fig. 2b1
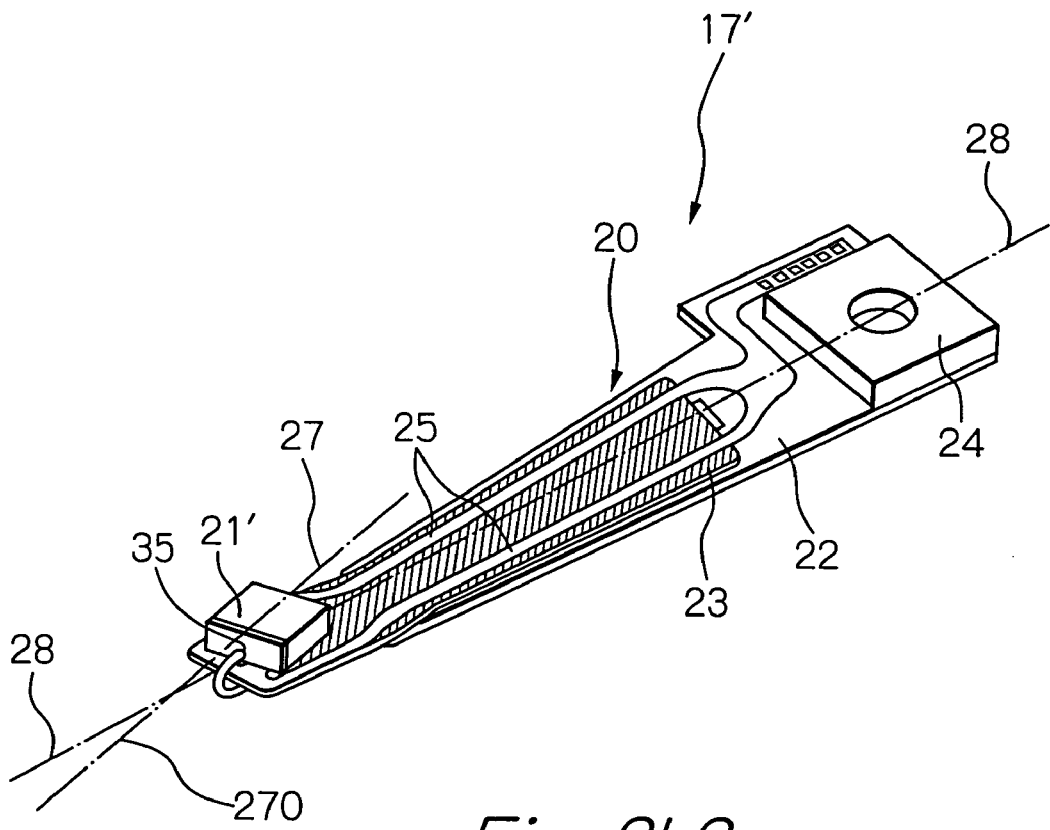
Fig. 2b2
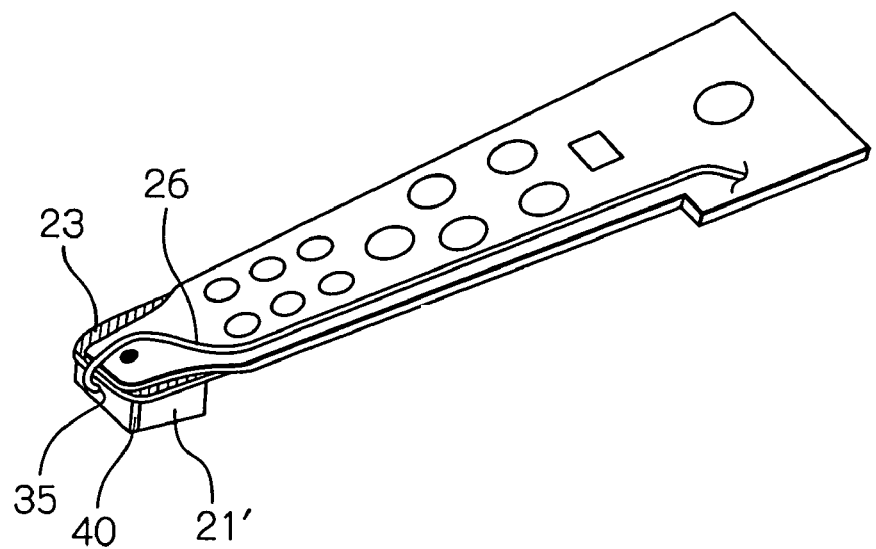

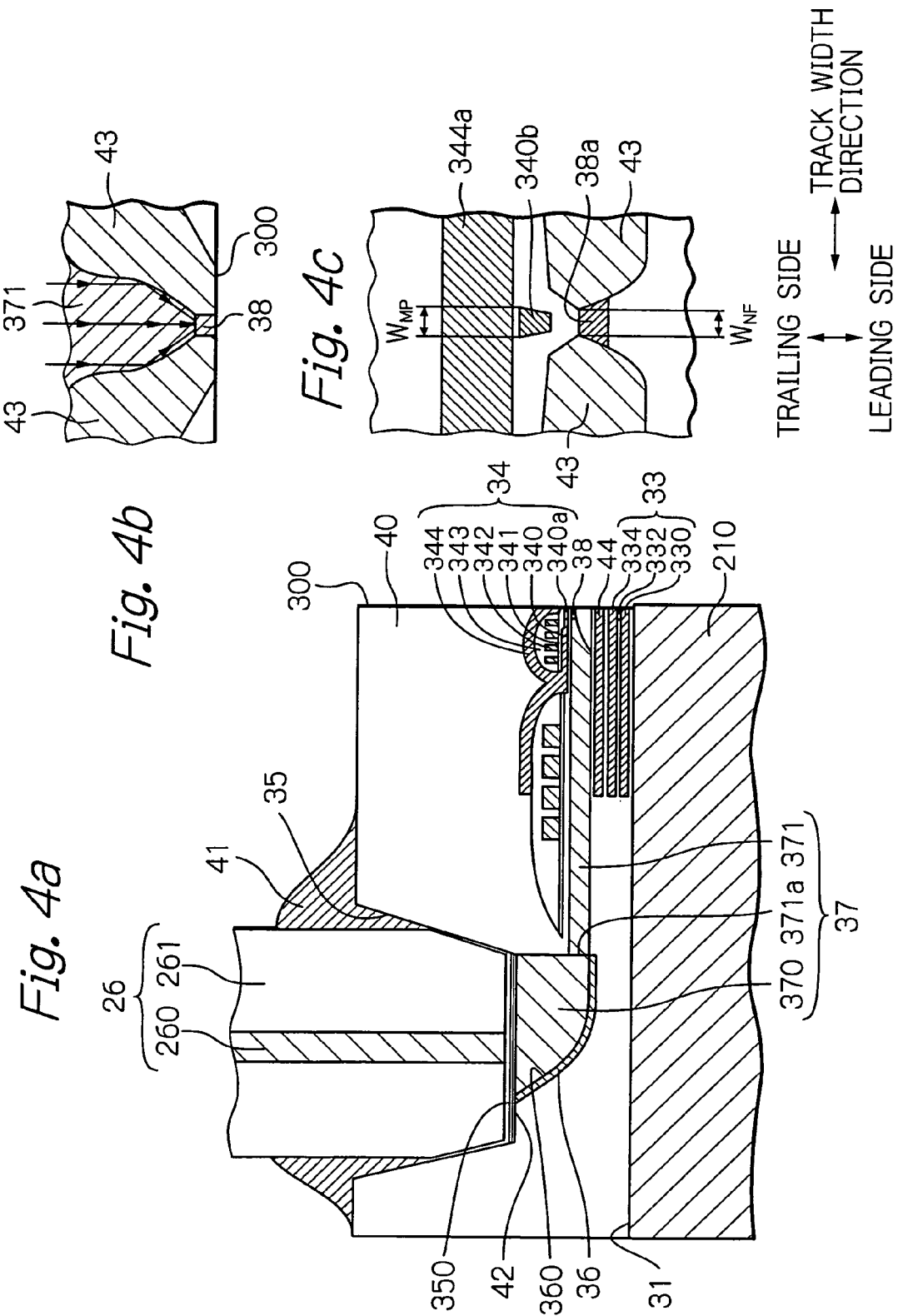

TRAILING SIDE
↕
LEADING SIDE

TRACK WIDTH
DIRECTION

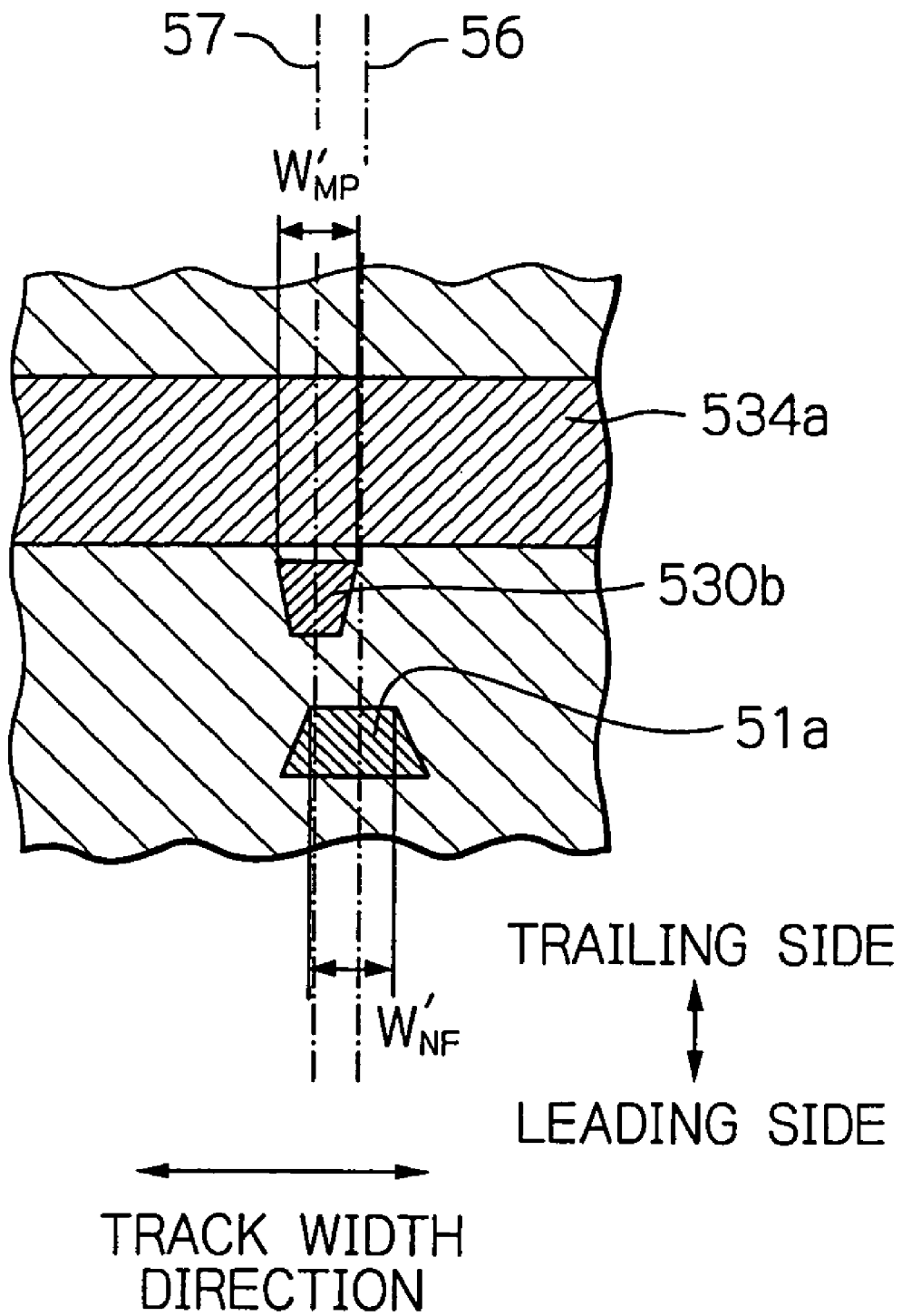

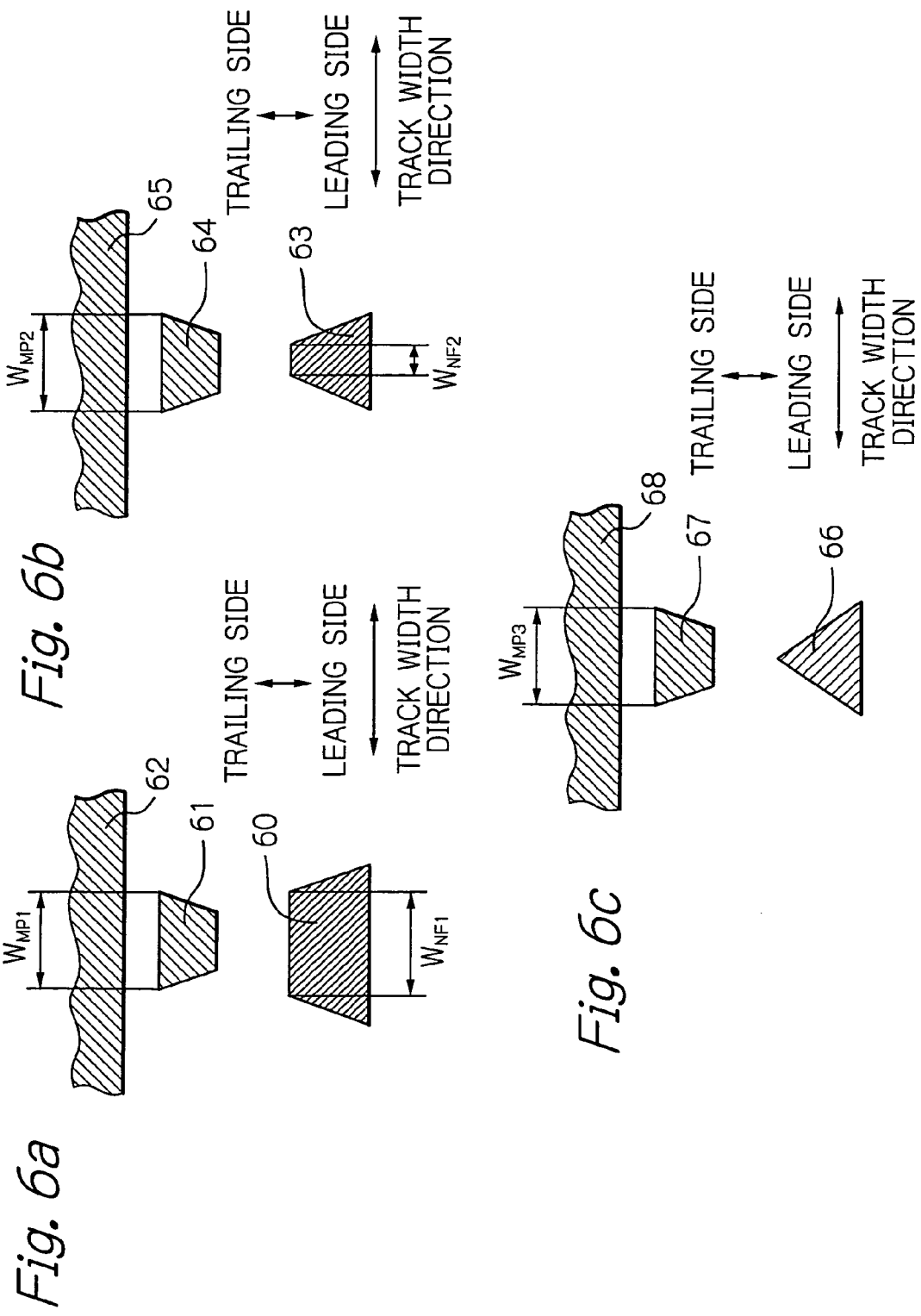

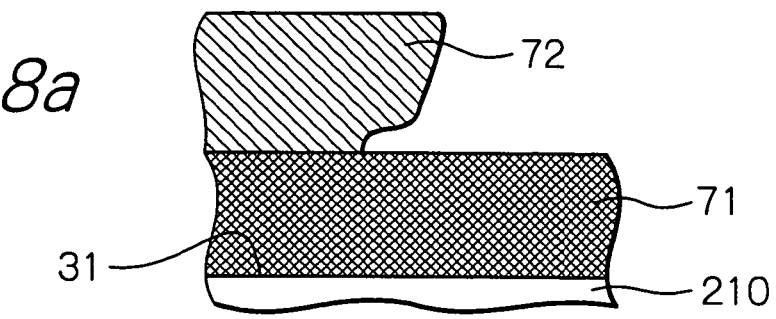
Fig. 8a
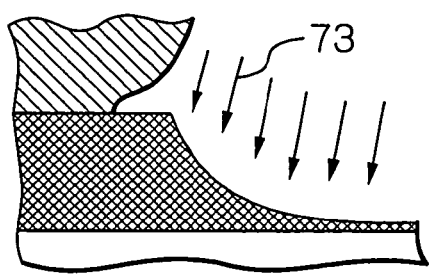
Fig. 8b1
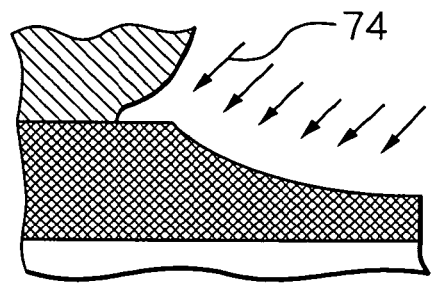
Fig. 8b2
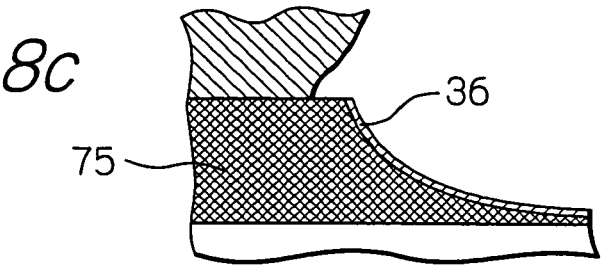
Fig. 8c
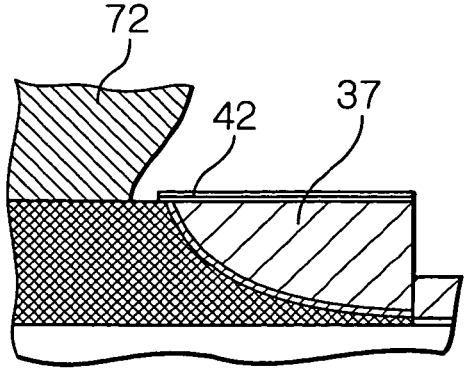
Fig. 8d
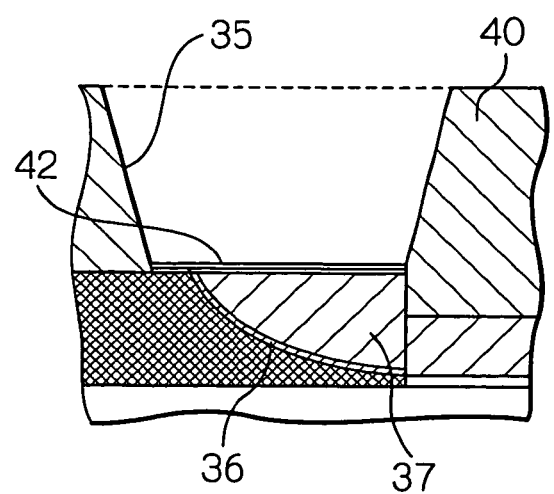
Fig. 8e

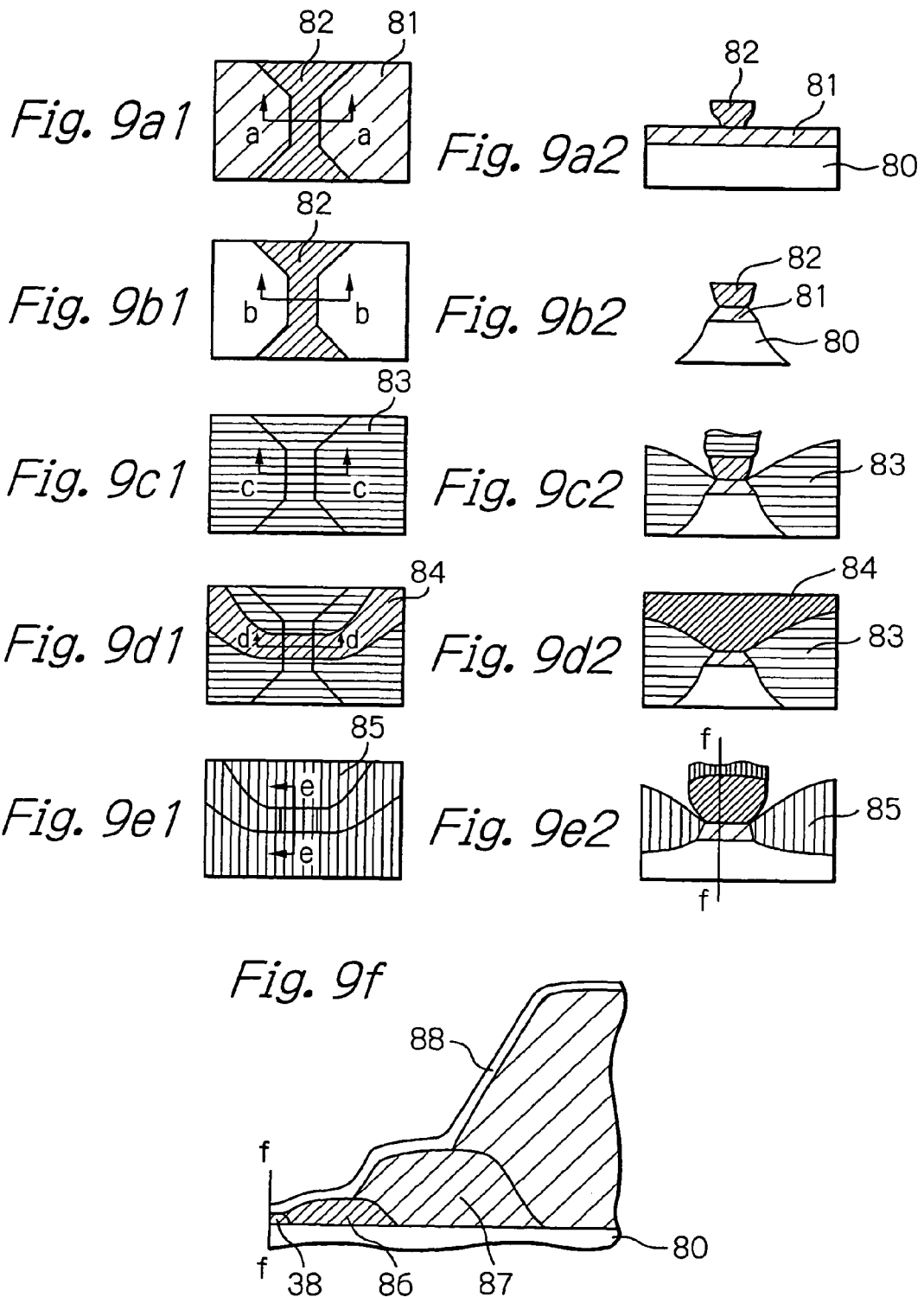

THIN-FILM MAGNETIC HEAD HAVING NEAR-FIELD-LIGHT-GENERATING PORTION WITH TRAPEZOIDAL END

PRIORITY CLAIM

This application claims priorities from Japanese patent application No. 2006-20441, filed on Jan. 30, 2006 and Japanese patent application No. 2006-25387, filed on Feb. 2, 2006, which are incorporated herein by reference.

BACKGROUND OF THE INVENTION

1. Field of the Invention

The present invention relates to a thin-film magnetic head for reading and writing data signals, a head gimbal assembly (HGA) with the thin-film magnetic head and a magnetic recording apparatus with the HGA. Especially, the present invention relates to a thin-film magnetic head for writing data signals by a heat-assisted perpendicular magnetic recording technique using a near-field light, an HGA with the thin-film magnetic head and a magnetic recording apparatus with the HGA.

2. Description of the Related Art

Recently, in a magnetic recording apparatus such as a magnetic disk drive apparatus, a thin-film magnetic head is strongly required to further improve its performance because the recording density of the apparatus becomes higher due to the spread use of data with larger volume. As the thin-film magnetic head, a composite-type thin-film magnetic head is widely used, which has a stacked structure of a magnetoresistive (MR) effect element for reading data signals from a magnetic recording medium such as a magnetic disk and an electromagnetic coil element for writing data signals to the magnetic recording medium.

The magnetic recording medium has a magnetically discontinuous layer where magnetic microparticles are gathered together. Usually, each of the magnetic microparticles has a single magnetic-domain structure, and one recording bit consists of a plurality of the magnetic microparticles. Therefore, for improving the recording density, irregularity in the boundary of the recording bit must be reduced by decreasing the size (volume) of the magnetic microparticle. However, a problem is likely to occur that the size decrease causes thermal stability of the magnetization of the recording bit to be degraded.

A guide of the thermal stability of the magnetization is given as $K_U V/k_B T$, where $K_U$ is a magnetic anisotropy energy in the microparticle, V is a volume of a single microparticle, $k_B$ is Boltzmann constant and T is absolute temperature. Decreasing the size of the microparticle is equivalent to decreasing the volume V. Therefore, when the size is decreased, the thermal stability is degraded due to degrease in the $K_U V/K_B T$ value. As a measure of the thermal stability problem, it may be possible that the $K_U$ is increased concurrently. However, the increase in the $K_U$ causes the increase in coercive force of the magnetic recording medium. On the other hand, the write field intensity of the magnetic head for writing data signals against the coercive force is limited by the amount of the saturation magnetic flux density of the soft-magnetic pole material of the head. Therefore, the head cannot write data signals to the medium when the coercive force exceeds the write field limit.

As the first method for solving the thermal stability problem, a perpendicular magnetic recording technique may be adopted instead of the conventional longitudinal magnetic recording technique. The thickness of the recording layer in the perpendicular magnetic recording medium can be increased more sufficiently than conventional. As a result, the thermal stability can be improved due to the larger volume V with the larger thickness.

As the second method, a patterned media may be considered as a candidate. While one recording bit consists of N pieces of the magnetic microparticles in the conventional magnetic recording as described above, one recording bit is a single pattern region with volume NV in the patterned media. As a result, the value of the guide of the thermal stability becomes $K_U NV/K_B T$, which means high improvement of the thermal stability.

As the third method for solving the thermal stability problem, a heat-assisted magnetic recording technique is proposed, in which the magnetic head writes data signals to the magnetic recording medium formed of a material with the large $K_U$ value, by reducing the coercive force of the medium with heat supplied to the medium just before the write field is applied. The heat-assisted magnetic recording technique has some similarity to a magnetooptic recording technique, however, obtains a spatial resolution corresponding to an applied magnetic field region, while the magnetooptic recording technique obtains a spatial resolution corresponding to an emitted light spot.

As a proposed heat-assisted magnetic recording, Japanese patent Publication No. 2001-255254A describes a light recording technique utilizing a near-field light probe that has a metal scatterer with strobilus shape formed on a substrate and a dielectric material film formed around the metal scatterer. And Japanese patent Publication No. 10-162444A describes a technique in which a head provided with a solid immersion lens writes ultrafine domains on a magnetooptical disk using a micro light spot. Further, U.S. Pat. No. 7,042,810 describes a heat-assisted technique in which an internal laser element emits a light to an optical fine aperture opposed to a medium.

Further, Japanese patent Publication No. 2004-158067A describes a scatterer as a near-field light probe, which is formed in contact with the main magnetic pole of a head for a perpendicular magnetic recording in such a way that the irradiated surface of the scatterer is perpendicular to the surface of the medium. And U.S. Pat. No. 6,674,594 describes the relation between the pole width $W_W$ of a recording head element and the width $T_{WW}$ of the area heated by a laser semiconductor in a recording and reproducing head having the laser semiconductor.

Furthermore, IEEE Transactions on Magnetics, Vol. 41, No. 10, pp. 2817-2821, 2005 describes a technique in which a recording pattern with the track width of approximately 70 nm is formed by using a near-field light and a magnetic field generated from a U-shaped near-field light probe formed on a quartz crystal slider. And Journal of the Magnetics Society of Japan, Vol. 29, No. 1, pp. 5-13, 2005 describes a photoheating element having a grating in which a transmitting diffraction grating is butted to be joined to a hardly-transmitting diffraction grating. Further, as examples of using an optic fiber, Japanese patent Publication No. 2000-173093A describes a structure in which a metal film with a pinhole is formed on an obliquely cut surface of an optic fiber. And U.S. Pat. No. 6,044,056 describes an optical flying head having a movable mirror for directing a laser light from an optic fiber to an optical lens system.

In the above-described techniques, the method of heating the medium by using a near-field light generated from a near-field-light-generating means that is irradiated with laser light from the optic fiber, etc. is considered as a promising technique because a fine near-field light having a required intensity can be obtained with comparative ease.

However, in these techniques, there is some possibility of writing error such as an insufficient writing to a desired track or an unwanted writing or erasing to the adjacent tracks, depending on the range and timing of the near-field light application during heat-assisting operation.

Actually, the end of the near-field-light-generating means reaches the head end surface opposed to a magnetic recording medium to heat the medium. Depending on the position and shape of the reaching end, there are some cases to miss sufficient writing to a track to be written because of insufficient heating of the track. Further, when writing at rather intervals after applying the near-field light, the coercive force of the medium may exceed the writing limit of the write field due to the cooldown of the medium. In this case, a desired writing cannot be performed. Furthermore, in the case that the near-field light covers the adjacent tracks, an unwanted writing may be performed on the adjacent tracks. However, in the past, no clear and adequate measures against these problems have been suggested.

Meanwhile, in the above-described thin-film magnetic head for perpendicular magnetic recording, the shape on the head end surface of the main magnetic pole is set to be a trapezoid with a longer edge on the trailing side. That is to say, the both side surfaces of the end of the magnetic pole have a bevel angle for avoiding unwanted writing and erasing to the adjacent tracks due to a skew angle derived from driving of a rotary actuator. However, in the case that the head for perpendicular magnetic recording is provided with the near-field-light-generating means, the near-field light has some possibility to cover the adjacent tracks under the influence of the skew angle, depending on the position and shape of the end of the near-field-light-generating means. Therefore, depending on the position and shape of the end of the main magnetic pole, an unwanted writing or erasing may be performed to the adjacent tracks.

As a measure against this problem, the above-described U.S. Pat. No. 6,674,594 describes a technique adjusting the relation between the width $W_W$ of a magnetic pole of a write head element and the width $T_{WW}$ of the area heated by a laser source to suppress the following deviance of the write head element to a read head element. However, this technique is not intended for a thin-film magnetic head with a main magnetic pole for perpendicular magnetic recording. Thus, in the past, no clear and adequate measures against this problem have been suggested.

BRIEF SUMMARY OF THE INVENTION

Therefore, it is an object of the present invention to provide a thin-film magnetic head for a heat-assisted magnetic recording which can perform a reliable writing immediately only on a desired track by applying a near-field light to a desired position and range, an HGA provided with this thin-film magnetic head and a magnetic recording apparatus provided with this HGA.

And it is another object of the present invention to provide a thin-film magnetic head in which the generation efficiency of near-field light is improved, and therefore a sufficient amount of near-field light can be applied to a desired position and range, an HGA provided with this thin-film magnetic head and a magnetic recording apparatus provided with this HGA.

Here, some terms will be defined before explaining the present invention. In a layered structure of elements formed on an element-formed surface of the substrate, a component that is closer to the element-formed surface than a standard layer is defined to be "below" or "lower" in relation to the standard layer, and a component that is in the stacking direction side of the standard layer is defined to be "above" or "upper" in relation to the standard layer.

According to the present invention, a thin-film magnetic head is provided, which comprises: a substrate having an opposed-to-medium surface and an element-formed surface perpendicular to the opposed-to-medium surface; an electromagnetic coil element for writing data signals, formed on/above the element-formed surface, and having a main magnetic pole layer, a pole end of the main magnetic pole layer reaching a head end surface on the side of the opposed-to-medium surface; and a near-field-light-generating (NFL-generating) portion for heating a portion of a magnetic recording medium during write operation by generating a near-field light, formed on/above the element-formed surface, and having a generation end reaching the head end surface, the generation end provided adjacent to the pole end and in the leading side of the pole end, and a shape of the generation end on the head end surface being a trapezoid with a shorter edge on the trailing side, or being a triangle with an apex on the trailing side and with a bottom on the leading side.

By using the above-described position and shape of the generation end, the neighborhood of the shorter edge of the generation end, which is the main heating portion, becomes much close to the pole end of the main magnetic pole layer, which is the writing portion. Therefore, the error in the track width direction of the positioning between the generation end and the pole end can be suppressed. Further, in the actual heat-assisted writing operations, just after the near-field light generated from the neighborhood of the shorter edge is applied to a part of the recording layer, the write field generated from the pole end is applied to the heated part. That is, the writing can be reliably performed almost without a pause just after the part of the recording layer is heated, which prevents the write error due to the inadequacies of the heated part and heating timing and enables the heat-assisted write operation to be performed reliably and stably.

In the thin-film magnetic head, it is preferable that a shape of the pole end on the head end surface is a trapezoid with a longer edge on the trailing side, and a length of the shorter edge of the generation end is longer than a length of the longer edge of the pole end. By using this configuration, the thin-film magnetic head of the present invention can be applied to a magnetically dominant type of the heat-assisted magnetic recording, in which the special resolution of a recording bit is determined by the write field.

Further, it is also preferable that a waveguide portion including a light path of a light applied to the NFL-generating portion is provided, and the NFL-generating portion has a contact with an end on the opposed-to-medium surface side of the waveguide portion. In this configuration, it is more preferable that a MR effect element for reading data signals having an end reaching the head end surface is formed on/above the element-formed surface, and the waveguide portion and the NFL-generating portion are provided between the MR effect element and the electromagnetic coil element. Further, it is also more preferable that an overcoat layer is formed on the element-formed surface so as to cover the electromagnetic coil element, the waveguide portion and the NFL-generating portion, and the waveguide portion is formed of a dielectric material with a refractive index larger than that of a constituent material of the overcoat layer.

Furthermore, it is also preferable that a portion near the head end surface of the waveguide portion is tapered toward the head end surface, and the NFL-generating portion is formed of the same material as the waveguide portion, and side conductor layers formed of a conductive material are provided so as to contact with both side ends in the track width direction of the NFL-generating portion and with both side ends in the track width direction of the tapered portion of the waveguide portion.

Furthermore, it is also preferable that the NFL-generating portion is a metal layer or a dielectric layer with a shape tapered toward the head end surface, and is sloped in respect to the element-formed surface in the form that a portion in the head end surface side is lifted up or pulled down, and has a light-received surface for receiving a light to generate a near-field light, and the light-received surface has a contact with an end surface on the opposed-to-medium surface side of the waveguide portion.

Furthermore, it is also preferable that, on the head end surface, a centerline perpendicular or almost perpendicular to the track width direction of the generation end is offset from a centerline perpendicular or almost perpendicular to the track width direction of the pole end. In the case, it is more preferable that the centerline of the generation end is offset from the centerline of the pole end toward the outer side of the magnetic recording medium when the head is opposed to the magnetic recording medium.

The offset configuration enables the generation end to fall almost into the track width that is mainly determined by the longer edge on the trailing side of the pole end, in every case that the head is positioned above the outer track and above the inner track. As a result, the near-field light has almost no possibility to cover the inner and outer adjacent tracks, which can prevent an unwanted writing or erasing to the adjacent tracks due to a skew angle of the head.

According to the present invention, an HGA is further provided, which comprises: the above-described thin-film magnetic head; a support mechanism for supporting the thin-film magnetic head; trace conductors for the electromagnetic coil element; trace conductors for a MR effect element when the thin-film magnetic head comprises the MR effect element; and an optic fiber for applying a light to the NFL-generating portion.

In the HGA, the thin-film magnetic head is preferably fixed on the supporting mechanism in such a way that a centerline of the thin-film magnetic head perpendicular or almost perpendicular to the track width direction becomes oblique to a centerline of the supporting mechanism in the longitudinal direction. Further, it is more preferable that a trailing side of the centerline of the thin-film magnetic head is directed away from the centerline of the supporting mechanism toward the outer side of the magnetic recording medium when being opposed to the magnetic recording medium.

According to the present invention, an magnetic recording apparatus is further provided, which comprises: at least one HGA above-described; at least one magnetic recording medium; a light source for providing a light through the optic fiber; and a recording/reproducing and light-emission control means for controlling read and write operations of the thin-film magnetic head to the magnetic recording medium and for controlling an emitting operation of the light source.

Further objects and advantages of the present invention will be apparent from the following description of preferred embodiments of the invention as illustrated in the accompanying drawings. Some elements have been designated with same reference numerals in the different drawings.

BRIEF DESCRIPTION OF THE SEVERAL
VIEWS OF THE DRAWINGS

FIG. 1 shows a perspective view schematically illustrating a major portion of an embodiment of the magnetic disk drive apparatus according to the present invention;

FIGS. 2a1 to 2b2 show perspective views illustrating embodiments of the HGA according to the present invention;

FIG. 4a shows a cross-sectional view taken along the line A-A in FIG. 3 schematically illustrating a major portion of the first and second embodiments of the thin-film magnetic head according to the present invention;

FIG. 4b shows a plain view schematically illustrating the waveguide portion and the NFL-generating portion;

FIG. 4c shows a plain view schematically illustrating the end on the head end surface of the NFL-generating portion of the first embodiment;

FIG. 5d shows a plain view schematically illustrating the shape on the head end surface of an NFL-generating portion of the fourth embodiment;

FIGS. 6a to 6e show schematic views of the head end surface illustrating various alternatives of the generation end of the NFL-generating portion;

FIGS. 8a to 8e show cross-sectional views explaining an embodiment of the forming process of the light acceptance cavity and the reflecting portion of the thin-film magnetic head according to the present invention;

Figure 1:
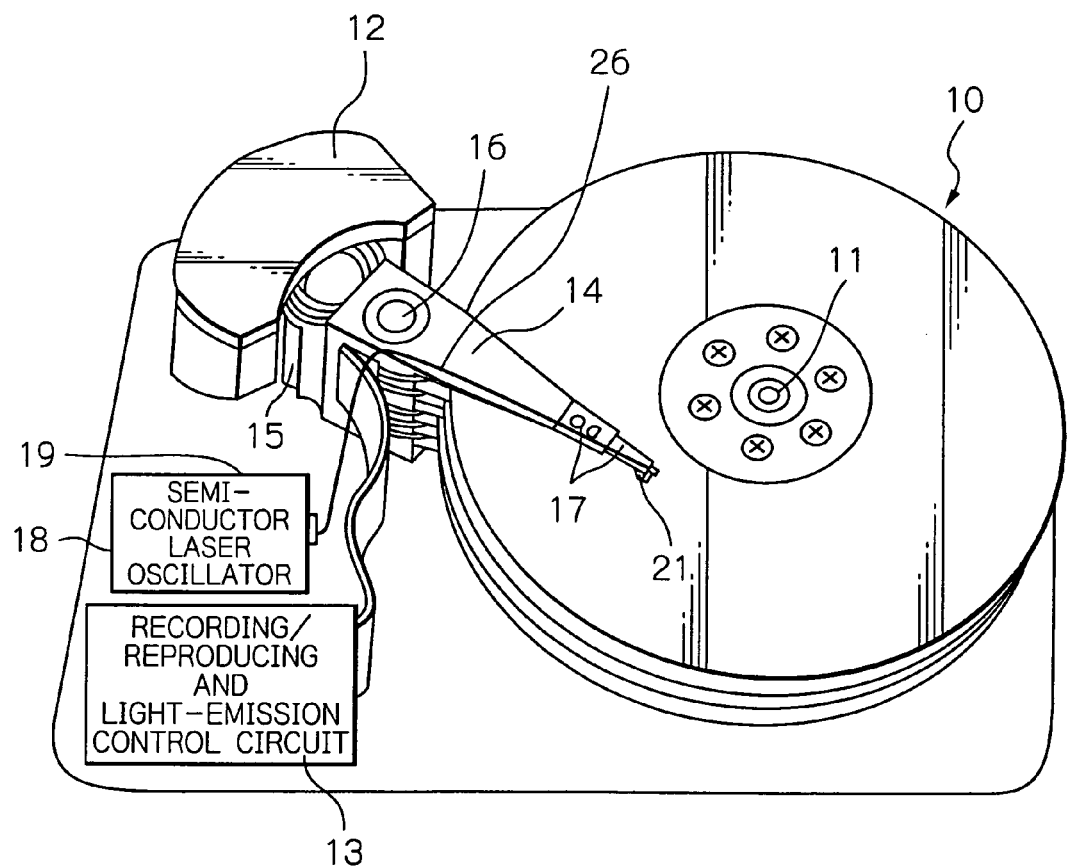
Figure 10:
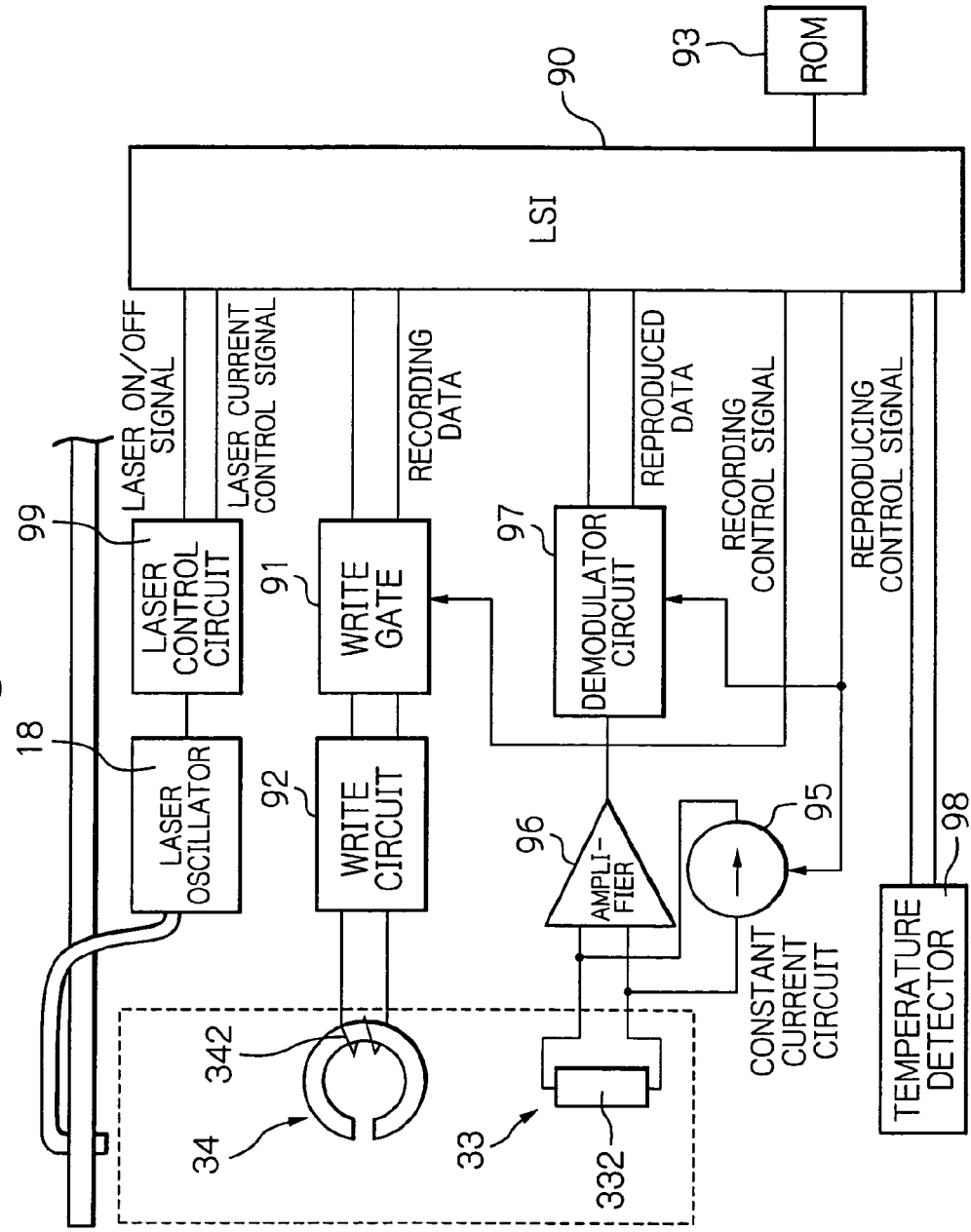

FIGS. 9a1 to 9f show cross-sectional views explaining an embodiment of the forming process of the tapered portion of the waveguide linear portion and the NFL-generating portion; and FIG. 10 shows a block diagram illustrating the circuit structure of the recording/reproducing and light-emission control circuit 13 of the magnetic disk drive apparatus shown in FIG. 1.

DETAILED DESCRIPTION OF THE INVENTION

FIG. 1 shows a perspective view schematically illustrating a major portion of an embodiment of the magnetic disk drive apparatus according to the present invention.

In FIG. 1, reference numeral 10 indicates a plurality of magnetic disks (magnetic recording media) for a perpendicular magnetic recording, rotating around a rotational axis of a spindle motor 11, 12 indicates an assembly carriage device for positioning a thin-film magnetic head (slider) 21 for the perpendicular magnetic recording on a track, and 13 indicates a recording/reproducing and light-emission control circuit for controlling read/write operations of the thin-film magnetic head and for controlling a semiconductor laser oscillator 18 that is a light source for generating a laser light used for heat-assisting operations, respectively.

The assembly carriage device 12 is provided with a plurality of drive arms 14. These drive arms 14 are rotatable around a pivot bearing axis 16 by means of a voice coil motor (VCM) 15 and stacked in the direction along this axis 16. An HGA 17 is provided on the end portion of each drive arm 14. A slider 21 is mounted on each HGA 17 in such a way as to be opposed to the surface of the magnetic disk 10. The each number of the magnetic disks 10, the drive arms 14, the HGAs 17 and the thin-film magnetic heads (sliders) 21 can also be only one.

The semiconductor laser oscillator 18 provides a laser light to an optic fiber 26. For this purpose, the cross-section surface of the optic fiber 26 is connected to an active layer position of the semiconductor laser oscillator 18 by using a fiber holder 19. The oscillation wavelength of the laser is, for example, 635 nm (nanometers).

FIGS. 2a1 to 2b2 show perspective views illustrating embodiments of the HGA according to the present invention. Here, FIGS. 2a1 and 2a2 show the first embodiment and the third embodiment described later, and FIGS. 2b1 and 2b2 show the second embodiment and the fourth embodiment described later. Further, FIGS. 2a1 and 2b1 are illustrated by viewing from the side opposed to the magnetic disk of the HGA 17, and FIGS. 2a2 and 2b2 are illustrated by viewing from the opposite side.

As shown in FIG. 2a1, the HGA 17 is constructed by fixing a thin-film magnetic head (slider) 21 having a magnetic head element on an end portion of a suspension 20 and by electrically connecting one end of a wiring member 25 to signal electrodes of the thin-film magnetic head 21.

The suspension 20 is mainly constructed of a load beam 22, a flexure 23 with elasticity fixed and supported on this load beam 22, a base plate 24 provided on the base portion of the load beam 22, and the wiring member 25 that is made up of trace conductors and connection pads electrically connected to both ends of the trace conductors and is provided on the flexure 23.

As shown in FIG. 2a2, the HGA 17 further has an optic fiber 26 for providing a laser light into the thin-film magnetic head 21. As described later, the laser-emitting end of the optic fiber 26 is inserted into a light acceptance cavity 35 formed on the upper surface of an overcoat layer 40 in the thin-film magnetic head 21, and is fixed by adhesive.

As shown in FIG. 2b1, the HGA 17' is constructed, as is the case of the HGA 17, by fixing a thin-film magnetic head (slider) 21' having a magnetic head element on an end portion of a suspension 20 and by electrically connecting one end of a wiring member 25 to signal electrodes of the thin-film magnetic head 21'. The structure of the suspension 20 may be the same as the above-described case of using the thin-film magnetic head 21.

However, the slider 21' is fixed on the flexure 23 in such a way that a centerline 27 of the slider 21' perpendicular or almost perpendicular to the track width direction becomes oblique to a centerline 28 of the suspension 20 in the longitudinal direction. Further, the trailing side 270 of the centerline 27 is directed away from the centerline 28 toward the outer side of the disk when being opposed to the disk. The combination of this oblique configuration and an offset of a generation end of a near-field-light-generating (NFL-generating) portion, as described later in detail, can prevent unwanted writing and erasing to the adjacent tracks due to a skew angle of the head.

As shown in FIG. 2a2, the HGA 17' further has, as is the case of the HGA 17, an optic fiber 26 for providing a laser light into the thin-film magnetic head 21'. As described later, the laser-emitting end of the optic fiber 26 is inserted into a light acceptance cavity 35 formed on the upper surface of an overcoat layer 40 in the thin-film magnetic head 21', and is fixed by adhesive.

It is obvious that the structure of the suspension in the HGAs 17 and 17' according to the present invention is not limited to the above-described one. Though not shown in the figures, it is also possible to attach a head drive IC chip or a semiconductor laser oscillator for providing a laser light to the optic fiber 26 at some midpoint of the suspension 20.

Figure 3:
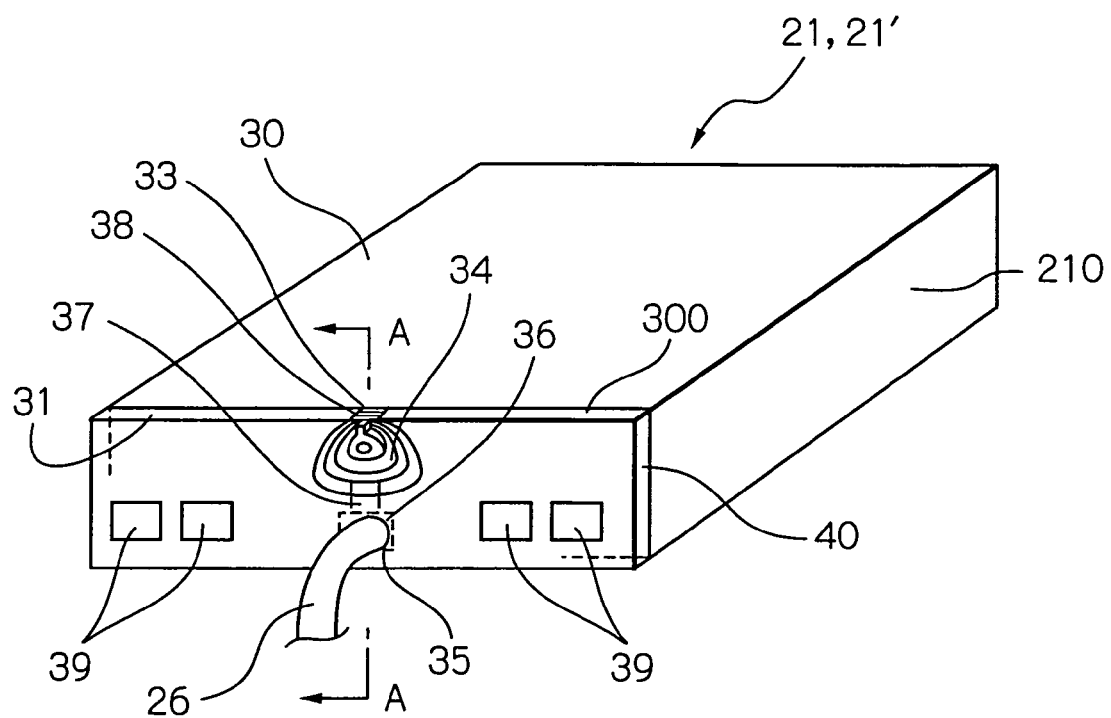
FIG. 3 shows a perspective view illustrating the thin-film magnetic head according to the present invention provided on the end portion of the HGA.

FIG. 3 shows a perspective view illustrating the thin-film magnetic head according to the present invention provided on the end portion of the HGA. The head shown in the figure is corresponding to the first to the fourth embodiments described later.

As shown in FIG. 3, the thin-film magnetic head 21 (21') is provided with: a slider substrate 210 having an air bearing surface (ABS) 30 as an opposed-to-medium surface for obtaining an appropriate flying height and an element-formed surface 31 perpendicular to the ABS 30; an MR effect element 33 for reading data signals and an electromagnetic coil element 34 for writing data signals, formed above/on the element-formed surface 31; a waveguide portion 37 provided between the MR effect element 33 and the electromagnetic coil element 34; an NFL-generating portion 35 that has a contact with the end of the waveguide portion 37 and has an end reaching the head end surface 300 on the ABS 30 side, for generating a near-field light used for the heat-assisted magnetic recording; a reflecting portion 36 for reflecting and directing a laser light from the optic fiber 26 to the waveguide portion 37; an overcoat layer 40 formed on the element-formed surface 31 in such a way as to cover the MR effect element 33, the electromagnetic coil element 34, the waveguide portion 37, the NFL-generating portion 38 and the reflecting portion 36; a light acceptance cavity 35 formed on the upper surface of the overcoat layer 40 to which the laser-emitting end of the optic fiber 26 is inserted; and four signal electrodes 39 exposed on the surface of the overcoat layer 40.

One ends of the MR effect element 33 and the electromagnetic coil element 34 reach the head end surface 300. During write and read operations, the thin-film magnetic head 21 hydrodynamically flies with a predetermined flying height above a rotating magnetic disk, and the one ends of the elements become opposed to the surface of the magnetic disk, then the head 21 performs a read operation by sensing signal fields from the magnetic disk and a write operation by applying signal fields to the magnetic disk.

Respective two of the four signal electrodes 37 are connected with the MR effect element 33 and the electromagnetic coil element 34. The number and positions of the electrodes are not limited to the case shown in FIG. 3. In the figure, there are four electrodes, however it is also possible to provide three electrodes and a ground connected to the slider substrate.

Figure 4D:
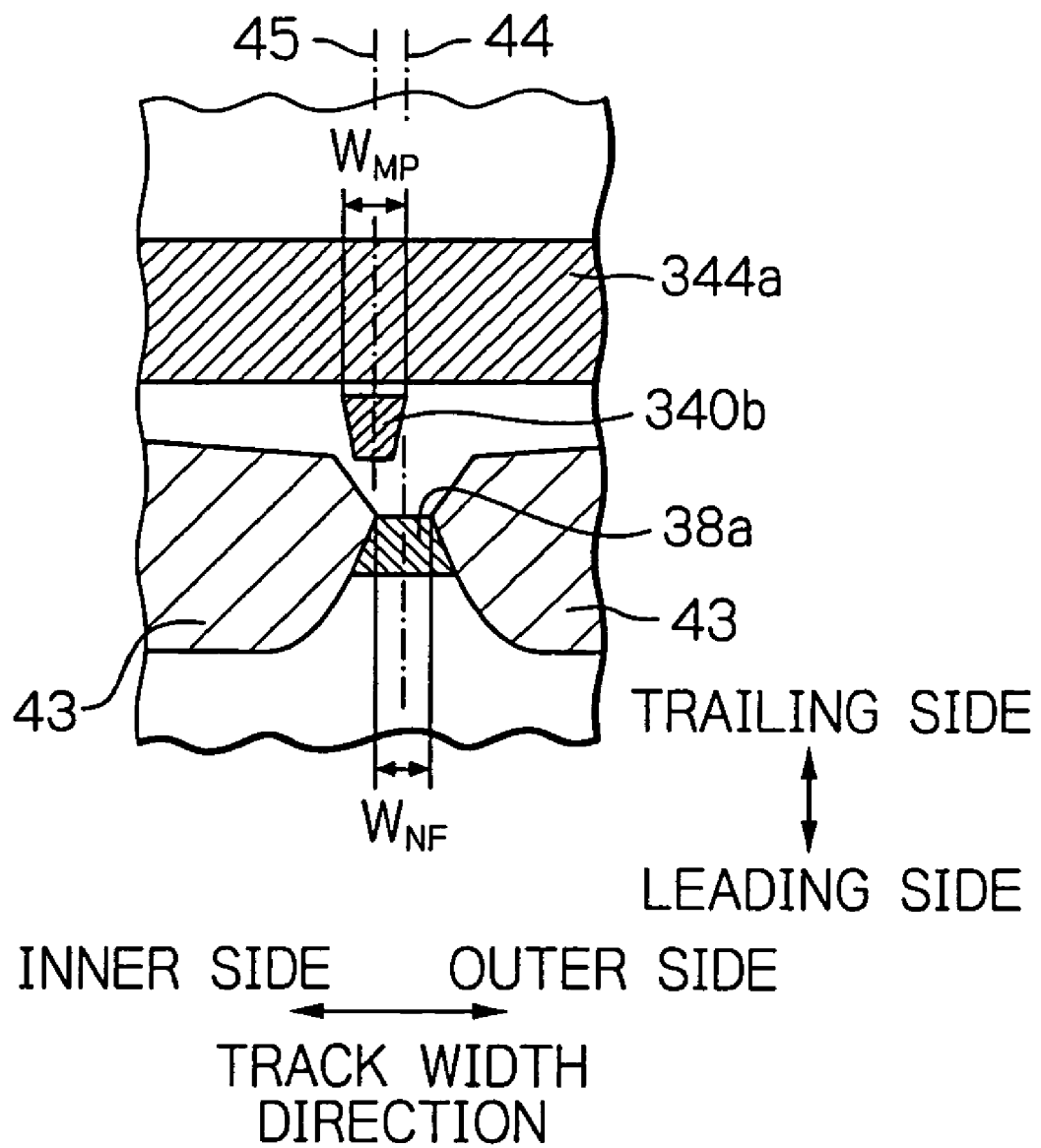
FIG. 4d shows a plain view schematically illustrating the end on the head end surface of the NFL-generating portion of the second embodiment.

FIG. 4a shows a cross-sectional view taken along the line A-A in FIG. 3 schematically illustrating a major portion of the first and second embodiments of the thin-film magnetic head according to the present invention, and FIG. 4b shows a plain view schematically illustrating the waveguide portion 37 and the NFL-generating portion 38. Further, FIG. 4c shows a plain view schematically illustrating the end on the head end surface 300 of the NFL-generating portion 38 of the first embodiment, and FIG. 4d shows a plain view schematically illustrating the end on the head end surface 300 of the NFL-generating portion 38 of the second embodiment.

As shown in FIG. 4a, the MR effect element 33 has an MR multilayer 332, a lower electrode layer 330 and an upper electrode layer 334 between which the MR multilayer 332 is sandwiched. The MR multilayer 332 includes a tunnel magnetoresistive (TMR) multilayered film in which a tunnel barrier layer is sandwiched between a free layer and a pinned layer, a current-perpendicular-to-plane giant magnetoresistive (CPP-GMR) multilayered film, or a current-in-plane giant magnetoresistive (CIP-GMR) multilayered film, and senses signal fields from the magnetic disk with excellently high sensitivity. When the MR multilayer 332 includes the CIP-GMR multilayered film, upper and lower shield layers are provided instead of the upper and lower electrode layers 334 and 330, and upper and lower shield gap layers are provided in respective positions between the MR multilayer 332 and each of the upper and lower shield layers, and further, an MR lead conductive layer is formed for applying sense currents and bringing out reproduction outputs.

The lower electrode layer 330 is stacked above/on the element-formed surface 31 of the slider substrate 210 made of AlTiC ($Al_2O_3$—TiC), etc., formed of, for example, NiFe, CoFeNi, CoFe, FeN, FeZrN or the multilayer of at least two of these materials, with thickness of approximately 0.3 µm (micrometer) to 3 µm. The upper electrode layer 334 is formed of, for example, NiFe, CoFeNi, CoFe, FeN, FeZrN or the multilayer of at least two of these materials, with thickness of approximately 0.3 µm to 4 µm. A read gap length, which is a distance between the upper and lower electrode layers 334 and 330, is, for example, approximately 0.02 µm to 1 µm.

The electromagnetic coil element 34 is for perpendicular magnetic recording, and includes a main magnetic pole layer 340, a gap layer 341, a write coil layer 342, a coil-insulating layer 343 and an auxiliary magnetic pole layer 344. The main magnetic pole layer 340 is a magnetic path to guide and converge the magnetic flux excited by currents flowing through the write coil layer 342. The length (thickness) in the stacking direction of the end portion 340a in the head end surface 300 side of the main magnetic pole layer 340 becomes smaller than that of the other portions. As a result, the main magnetic pole layer 340 can generate a fine write field corresponding to higher density recording.

The main magnetic pole layer 340 is formed of, for example, an alloy of two or three elements selected from a group consisting of Ni, Fe and Co, or an alloy of the two or three elements to which at least one appropriate element is added, with thickness of approximately 0.01 µm to 0.5 µm in the end portion on the ABS side and with thickness of approximately 0.5 µm to 3 µm in the other portions. The gap layer 341 is formed of, for example, $Al_2O_3$ (alumina), $SiO_2$ (silicon dioxide), AlN (aluminum nitride) or DLC (diamond-like carbon), with thickness of approximately 0.01 µm to 0.5 µm. The write coil layer 342 is formed of, for example, Cu with thickness of approximately 0.5 µm to 3 µm. The coil insulating layer 343 is formed of, for example, a heat-cured resist so as to cover the write coil layer 342, with thickness of approximately 0.1 µm to 5 µm. The auxiliary magnetic pole layer 344 is formed of, for example, an alloy of two or three elements selected from a group consisting of Ni, Fe and Co, or an alloy of the two or three elements to which at least one appropriate element is added, with thickness of approximately 0.5 µm to 5 µm.

A light acceptance cavity 35 is a concave portion formed on the upper surface of the overcoat layer 40, is provided directly above the reflecting portion 36. The laser-emitting end of the optic fiber 26, for providing a laser light to the NFL-generating portion 38, is inserted into the light acceptance cavity 35 from the just upper side, and is fixed by an adhesive 41 of, for example, epoxy resin. The laser-emitting end portion of the optic fiber 26 is chamfered and is fixed precisely in a predetermined position without interspace to the light acceptance cavity 35 having a sloped wall surface. The end surface of the optic fiber 26 is opposed or has surface contact to the bottom surface 350 of the light acceptance cavity 35. Here, the diameter of the laser-emitting end of the optic fiber 26 is in the range of approximately 5 µm to 500 µm. Therefore, the average bore diameter of the light acceptance cavity 35 is set precisely according to the value. The beam diameter of the laser light provided from the laser-emitting end of the optic fiber 26 is also in the range of approximately 5 µm to 500 µm.

An antireflection film 42 may be formed on the bottom surface 350 of the light acceptance cavity 35 to reduce a reflection loss of the laser light from the optic fiber 26. The antireflection film 42 has a monolayer structure of an ion-assisted evaporation film of, for example, $Ta_2O_5$ or $SiO_2$, or a multilayered structure of alternate ion-assisted evaporation films of, for example, $Ta_2O_5$ and $SiO_2$. The monolayer/multilayered structure is optically designed depending on the wavelength of the incident laser light.

The reflecting portion 36 is positioned directly below the light acceptance cavity 35 and at the rear of the MR effect element 33, the electromagnetic coil element 34 and the NFL-generating portion 38 when viewing from the head end surface 300. The reflecting portion 36 is formed of a metal layer of, for example, Au, Ag, Al, Cu or Ti, or an alloy layer of at least two of these elements, and has a reflecting surface 360. The reflecting surface 360 is curved so as to converge and direct a laser light from the optic fiber 26 to the end 371a of the waveguide linear portion 371, and thus plays a role to make the laser light from the optic fiber 26 reach the NFL-generating portion 38 as much as possible, which improves a generation efficiency of the near-field light. The layer thickness of the reflecting portion 36 is in the range of approximately 10 nm (nanometers) to 500 nm, and the width in the track width direction of the portion 36 is in the range of approximately 10 µm to 500 µm. The optic fiber 26 consists of a core 260 and a clad 261 covering the core 260. The diameter of the core 260 is, for example, approximately 8 µm. The laser light is emitted from the end of the core 260. Therefore, the reflecting surface 360 has an appropriate curve at least directly below the core 260.

The structure of the reflecting portion is not limited to the above-described one. It is also possible to use, as a reflecting portion, a plane mirror, a grating or a prism.

As described above, the light acceptance cavity 35 is formed in the overcoat layer 40 of the head, thus the optic fiber 26 is fixed directly to the head. As a result, the light path of the laser light from the optic fiber 26 almost never becomes fluctuated or off-course by the vibration during driving. Therefore, according to the thin-film magnetic head of the present embodiment, the positional relations between the laser-emitting end of the optic fiber 26 and the reflecting portion 36 and between the laser-emitting end and the NFL-generating portion 38 become stable, then, the laser light can reliably and stably reach the NFL-generating portion 38 via the reflecting portion 36.

The light acceptance cavity 35 and the reflecting portion 36 are formed together by a sequential thin-film process described layer. That is, the light acceptance cavity 35, as is provided on the upper surface of the overcoat layer 40, can be formed on a series of the thin-film process from the formation of the reflecting portion 36. Therefore, the size and the positional relation of the light acceptance cavity 35 can be precisely set by using a patterning technique of photolithography. As a result, the fixed position of the laser-emitting end of the optic fiber 26 can be precisely set with ease. Therefore, a desired generation efficiency of the near-field light can be obtained because the laser light from the optic fiber 26 is applied to the NFL-generating portion 38 as designed.

The waveguide portion 37 includes a light path ranging from the bottom surface 350 of the light acceptance cavity 35 to the NFL-generating portion 38 via the reflecting portion 36, and consists of; a waveguide reflection portion 370 positioned directly below the light acceptance cavity 35 and including the area between the bottom surface 350 and the reflecting surface 360; and a waveguide linear portion 371 positioned between the MR effect element 33 and the electromagnetic coil element 34 and extended in the direction (almost) parallel to the element-formed surface 31, the portion near the head end surface 300 of which is tapered toward the head end surface 300. The waveguide portion 37 is formed of a dielectric material with a higher reflective index n than that of the overcoat layer 40. For example, in the case that the overcoat layer 40 is formed of a $SiO_2$ (n=1.5), the waveguide portion 37 may be formed of an $Al_2O_3$ (n=1.63). Further, in the case that the overcoat layer 40 is formed of an $Al_2O_3$ (n=1.63), the waveguide portion 37 may be formed of a $Ta_2O_5$ (n=2.16), $Nb_2O_5$ (n=2.33), TiO (n=2.3 to 2.55) or $TiO_2$ (n=2.3 to 2.55). These constituent materials of the waveguide portion 37 can allow the propagation loss of the laser light to become smaller due to not only its excellent optical properties but also the formation of total reflection condition at the interface. As a result, the generation efficiency of the near-field light can be improved.

The NFL-generating portion 38 may be also formed of the same dielectric material as the waveguide portion 37. One end of the portion 38 is in contact with the end in the head end surface 300 side of the waveguide linear portion 37, and the other end reaches the head end surface 300. As shown in FIG. 4b, side conductor layers 43 are provided so as to contact with both side ends in the track width direction of the NFL-generating portion 38 and with both side ends in the track width direction of the tapered portion of the waveguide linear portion 371. The side conductor layers 43 are formed of Au, Pd, Pt, Rh, Ir or an alloy of at least two selected from these elements, or the alloy to which Al, Cu, etc. is added. The just-described configuration causes the most of the laser light propagating through the waveguide linear portion 371 to converge into the NFL-generating portion 38 via the reflection on reflecting surfaces 430 of the side conductor layers 43. Therefore, more laser light can reach the NFL-generating portion 38, and the generation efficiency of the near-field light can be improved.

The width in the track width direction and thickness of the NFL-generating portion 38 are much smaller than the wavelength of the incident laser light, and are in the ranges of, for example, approximately 10 nm to 300 nm and approximately 10 nm to 200 nm, respectively. When the NFL-generating portion 38 receives a laser light, electric dipoles having forced vibrations in the track width direction are generated at the interface between the dielectric material of the portion 38 and the side conductor layer 43 by the electric field of the laser light vibrated in the track width direction. The vibrations of the electric dipoles become almost uniform because the size of the NFL-generating portion 38 is sufficiently smaller than the wavelength of the laser light. The uniform vibrations of the electric dipoles cause an electromagnetic wave to be radiated in the direction perpendicular to the vibration direction, that is, in the direction toward the surface of the magnetic disk. The electric flux lines of the electromagnetic wave propagate in making nodes by repeating spreading and closing themselves during vibrating such that the polarity of the electric dipoles alternates. The adjacent region of the electric flux lines ranging from the NFL-generating portion 38 to the first node becomes a near-field light.

The electric field of the near-field light is incomparably stronger compared to the incident laser light, and the extremely strong near-field light can heat a part of the recording layer of the opposed magnetic disk rapidly. The heating causes the coercive force of the part of the recording layer to be decreased to a degree that the write field generated from the electromagnetic coil element 34 can perform writing. As a result, the writing can be performed even under using the magnetic disk with high coercive force for higher density recording. Here, the near-field light exists in the region from the head end surface 300 to a distance of the above-described width in the track width direction or the thickness of the NFL-generating portion 38 toward the magnetic disk. Therefore, under the present flying height of 10 nm or less, the near-field light can reach the part of the recording layer sufficiently. Further, the width of the generated near-field light is comparable with the above-described width or thickness, and the electric field of the near-field light is attenuated exponentially in the region out of the width or thickness range. Therefore, the near-field light can heat the part of the recording layer extremely locally.

The length (height) in the direction perpendicular to the head end surface 300 of the NFL-generating portion 38 is in the range of, for example, approximately 10 nm to 500 nm. The width in the track width direction of the widest portion of the waveguide linear portion 370 is in the range of, for example, approximately 20 nm to 500 nm.

Here, the characteristic of the first embodiment will be explained by using FIG. 4c. As shown in the figure, on the head end surface 300, the generation end 38a of the NFL-generating portion 38 of the first embodiment is provided adjacent to the pole end 340b of the main magnetic pole layer 340 of the electromagnetic coil element 34 and in the just leading side in the direction perpendicular to the track width direction of the pole end 340b. And the generation end 38a has a shape of trapezoid with a shorter edge on the trailing side. The near-field light becomes strongest near the shorter edge generally, though depending on the wavelength of the incident laser light and the shape of the waveguide linear portion 371. That is to say, the neighborhood of the shorter edge on the trailing side becomes a main heating portion during heat-assisting operations.

According to the above-described position and shape of the generation end 38a, the neighborhood of the shorter edge of the generation end 38a, which is the main heating portion, is much close to the pole end 340b of the main magnetic pole layer 340, which is the writing portion. Therefore, the error in the track width direction of the positioning between the generation end 38a and the pole end 340b can be suppressed. Further, in the actual heat-assisted writing operation, just after the near-field light generated from the neighborhood of the shorter edge is applied to a part of the recording layer, the write field generated from the pole end 340b is applied to the heated part. That is, the writing can be reliably performed almost without a pause just after the part of the recording layer is heated, which prevents the write error due to the inadequacies of the heated part and heating timing and enables the heat-assisted write operation to be performed reliably and stably.

Also on the head end surface 300, the pole end 340b has a shape of trapezoid with a longer edge on the trailing side. That is, the both side edges of the pole end 340b have a bevel angle for avoiding unwanted writing and erasing to the adjacent tracks due to a skew angle derived from driving of a rotary actuator. The amount of the bevel angle is, for example, approximately 15° (degrees). In fact, the write field is mainly generated near the longer edge of the pole end 340b, and therefore, the length of the longer edge mainly determines the width in which the write field ranges.

Next, the characteristic of the second embodiment will be explained by using FIG. 4d. As shown in the figure, on the head end surface 300, the pole end 340b of the main magnetic pole layer 340 of the second embodiment has, as the first embodiment has, a shape of trapezoid with a longer edge on the trailing side. And the generation end 38a of the NFL-generating portion 38 of the second embodiment is also provided adjacent to the pole end 340b and in the leading side of the pole end 340b. And the generation end 38a also has a shape of trapezoid with a shorter edge on the trailing side. However, in the second embodiment, the centerline 44 perpendicular or almost perpendicular to the track width direction of the generation end 38a is offset from the centerline 45 perpendicular or almost perpendicular to the track width direction of the pole end 340b toward the outer side of the disk when the head is opposed to the disk. The combination of the offset of the generation end and the above-described oblique configuration of the head as shown in FIGS. 2b1 and 2b2 can prevent unwanted writing and erasing to the adjacent tracks due to a skew angle of the head, as described later in detail.

Further, in the first and second embodiments, the length $W_{NF}$ of the shorter edge on the trailing side of the generation end 38a and the length $W_{MP}$ of the longer edge on the trailing side of the pole end 340b are set to satisfy the relation of $W_{NF} > W_{MP}$, in the case of the magnetically dominant type in the heat-assisted magnetic recording, in which the special resolution of a recording bit is determined by the write field. The relation of $W_{NF} > W_{MP}$ will be explained later in detail.

The above-described heat-assisted magnetic recording technique has a possibility to achieve much higher recording density of an order of 1 Tbits/in$^2$, by using the thin-film magnetic head for perpendicular magnetic recording with the magnetic disk with high coercive force to micrify recording bits.

Further, as shown in FIG. 4a, a shielding-between-elements layer 44 is formed between the MR effect element 33 and the waveguide linear portion 371 (the NFL-generating portion 38). The shielding-between-elements layer 44 plays a role of preventing magnetic fields generated from the electromagnetic coil element 34 from acting as a noise during reading. Further, though not shown in the figures, a backing coil element may be formed between the shielding-between-elements layer 44 and the waveguide linear portion 371. The backing coil element suppresses the wide area adjacent-track erase (WATE) behavior which is an unwanted write or erasing operation to the magnetic disk, by generating a magnetic flux for negating the magnetic loop that arises from the electromagnetic coil element 34 through the upper and lower electrode layers of the MR effect element 33. Further, the write coil layer 342 is a monolayer in FIG. 4a, however may have a two or more layered structure or a helical coil shape.

Figure 5A:
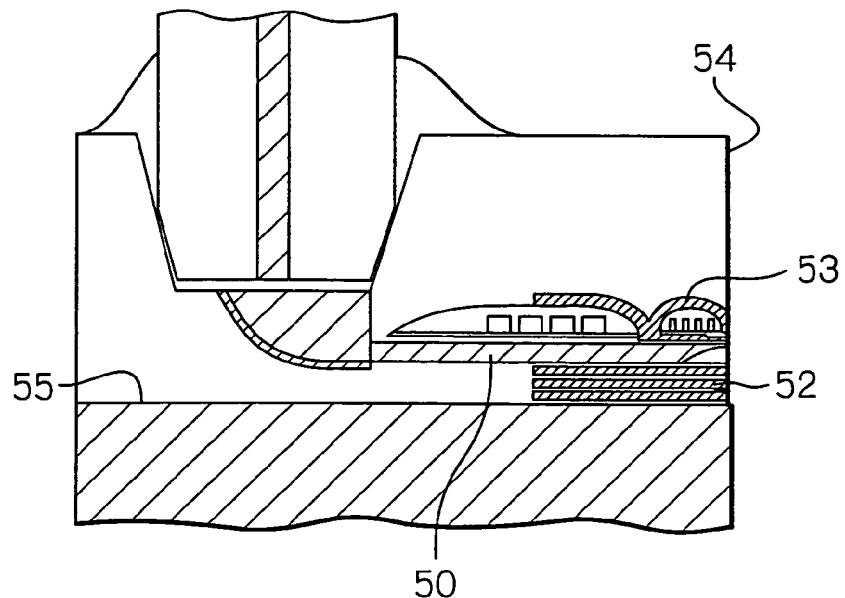
FIGS. 5a and 5b show cross-sectional view and perspective view schematically illustrating a major portion of the third and fourth embodiments of the thin-film magnetic head shown in FIG. 3.
Figure 5B:
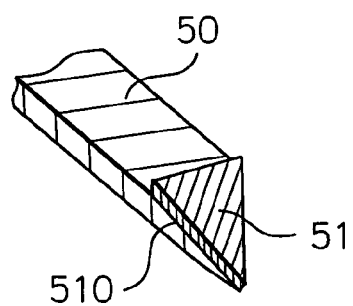
Figure 5C:
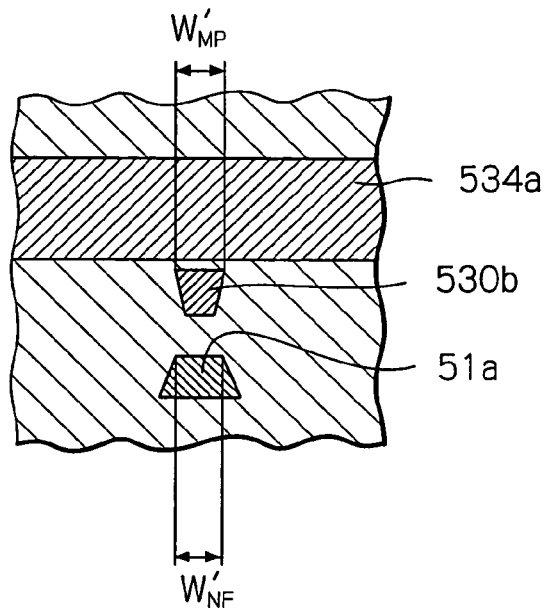
FIG. 5c shows a plain view schematically illustrating the shape on the head end surface of an NFL-generating portion of the third embodiment.

FIGS. 5a and 5b show cross-sectional view and perspective view schematically illustrating a major portion of the third and fourth embodiments of the thin-film magnetic head shown in FIG. 3, FIG. 5c shows a plain view schematically illustrating the shape on the head end surface 54 of an NFL-generating portion 51 of the third embodiment, and FIG. 5d shows a plain view schematically illustrating the shape on the head end surface 54 of an NFL-generating portion 51 of the fourth embodiment.

As shown in FIG. 5a, in the third and fourth embodiments, a waveguide portion 50 is provided between the MR effect element 52 and the electromagnetic coil element 53, as is the case of the first and second embodiments shown in FIG. 4a. An NFL-generating portion 51 is provided in contact with the end on the head end surface 54 side of the waveguide portion 50. The NFL-generating portion 51 has a shape tapered toward the head end surface 54, and is sloped in respect to the element-formed surface 55 in the form that the portion in the head end surface 54 side is lifted up, and has a light-received surface 510 for receiving the laser light from the optic fiber. The light-received surface 510 of the NFL-generating portion 51 is in contact with the end surface on the head end surface 54 side of the waveguide portion 50. Here, in FIG. 5b, the waveguide portion 50 and NFL-generating portion 51 are illustrated as perspective figures viewed from the element-formed surface 55 side (from the downside) for viewability.

The NFL-generating portion 51 is formed of Au, Pd, Pt, Rh, Ir or an alloy of at least two selected from these elements, or the alloy to which Al, Cu, etc. is added. When the light-received surface 510 receives a laser light, the electric field of the laser light forces inner free electrons in the constituent material of the NFL-generating portion 51 to be oscillated uniformly, and then, plasmons are excited. The plasmons propagate toward the tip on the head end surface 54 side of the NFL-generating portion 51, and causes a near-field light with extraordinary high intensity of its electric field to be generated much close to the tip. The generated near-field light enables the heat-assisted magnetic recording to be performed.

Here, the further characteristic of the third embodiment will be explained by using FIG. 5c. As shown in the figure, on the head end surface 54, the generation end 51a of the NFL-generating portion 51 of the third embodiment is provided adjacent to the pole end 530b of the main magnetic pole layer of the electromagnetic coil element 53 and in the just leading side in the direction perpendicular to the track width direction of the pole end 530b. And the generation end 51a has a shape of trapezoid with a shorter edge on the trailing side. Therefore, the error in the track width direction of the positioning between the generation end 51a and the pole end 530b can be suppressed. Further, in the actual heat-assisted writing operation, just after the near-field light generated from the neighborhood of the shorter edge of the generation end 51a is applied to a part of the recording layer, the write field generated from the pole end 530b is surely applied to the heated part. That is, the writing can be reliably performed almost without a pause just after the part of the recording layer is heated, which prevents the write error due to the inadequacies of the heated part and heating timing and enables the heat-assisted write operation to be performed reliably and stably.

Next, the further characteristic of the fourth embodiment will be explained by using FIG. 5d. As shown in the figure, on the head end surface 54, the generation end 51a of the NFL-generating portion 51 of the fourth embodiment is also provided adjacent to the pole end 530b and in the leading side of the pole end 530b. And the generation end 51a also has a shape of trapezoid with a shorter edge on the trailing side. However, in the fourth embodiment, the centerline 56 perpendicular or almost perpendicular to the track width direction of the generation end 51a is offset from the centerline 57 perpendicular or almost perpendicular to the track width direction of the pole end 530b toward the outer side of the disk when the head is opposed to the disk. The combination of the offset of the generation end and the above-described oblique configuration of the head can prevent unwanted writing and erasing to the adjacent tracks due to a skew angle of the head, as described later in detail. Further, because the generation end 51*a* is provided adjacent to the pole end 530*b* and in the leading side of the pole end 530*b*, the error in the track width direction of the positioning between the generation end 51*a* and the pole end 530*b* can be suppressed. Further, in the actual heat-assisted writing operation, just after the near-field light generated from the neighborhood of the shorter edge of the generation end 51*a* is applied to a part of the recording layer, the write field generated from the pole end 530*b* is surely applied to the heated part. That is, the writing can be reliably performed almost without a pause just after the part of the recording layer is heated, which prevents the write error due to the inadequacies of the heated part and heating timing and enables the heat-assisted write operation to be performed reliably and stably.

Further, in the third and fourth embodiments, the length $W_{NF}'$ of the shorter edge on the trailing side of the generation end 51*a* and the length $W_{MP}'$ of the longer edge on the trailing side of the pole end 530*b* are set to satisfy the relation of $W_{NF}'>W_{MP}'$, in the case of the magnetically dominant type in the heat-assisted magnetic recording, in which the special resolution of a recording bit is determined by the write field.

Figure 6D:
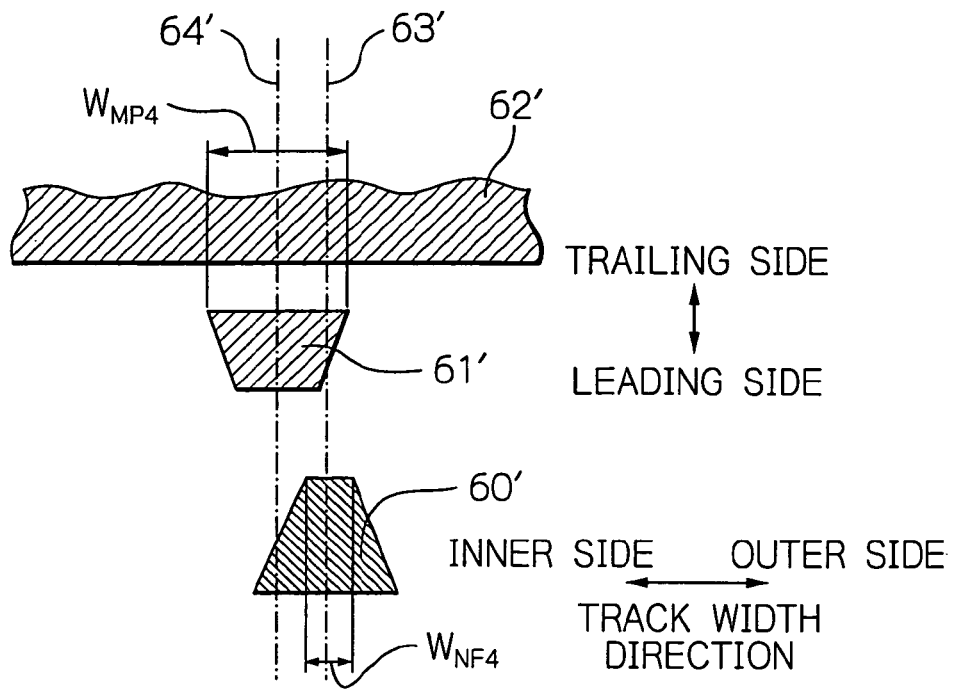
Figure 6E:
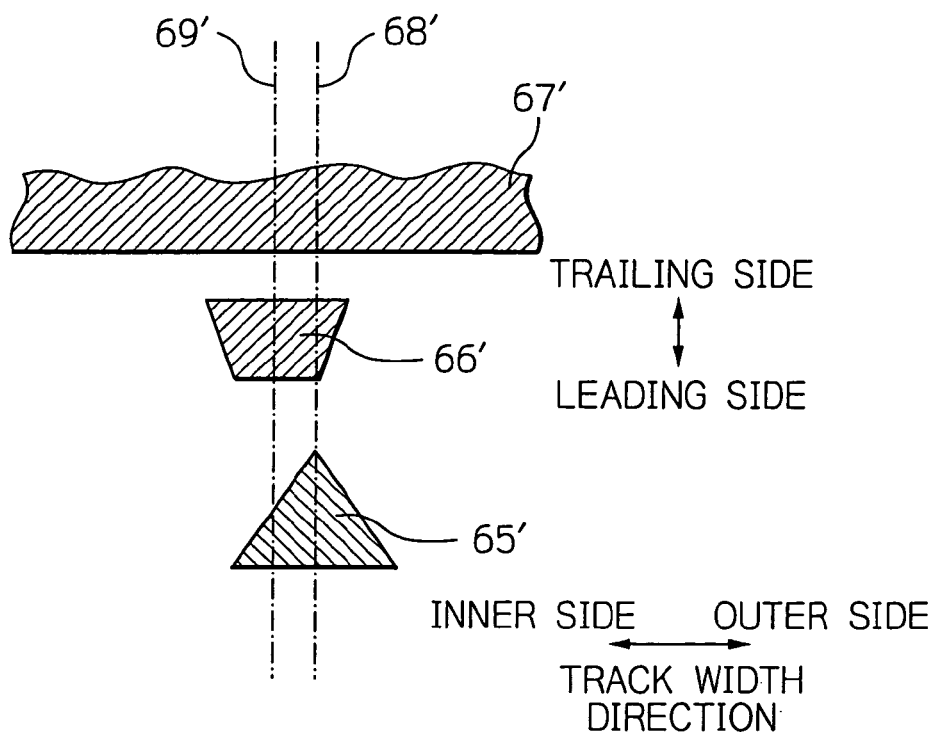

FIGS. 6*a* to 6*e* show schematic views of the head end surface illustrating various alternatives of the generation end of the NFL-generating portion. Here, FIGS. 6*a* to 6*c* show alternatives to the first and third embodiments, and FIGS. 6*d* and 6*e* show alternatives to the second and fourth embodiments.

As shown in FIG. 6*a*, on the head end surface, the generation end 60 of the NFL-generating portion is provided adjacent to the pole end 61 and in the leading side of the pole end 61, and has a shape of trapezoid with a shorter edge on the trailing side. Further, the length $W_{NF1}$ of the shorter edge on the trailing side of the generation end 60 and the length $W_{MP1}$ of the longer edge on the trailing side of the pole end 61 are set to satisfy the relation of $W_{NF1}>W_{MP1}$. That is to say, the generation end 60 and the pole end 61 show the same configuration as the first and third embodiments shown in FIGS. 4*c* and 5*c*.

As described above, the neighborhood of the shorter edge on the trailing side of the generation end 60 becomes a main heating portion during the heat-assisting operation. The length $W_{NF1}$ mainly determines the width to be heated. Further, the write field is mainly generated near the longer edge of the pole end 61, and therefore, the length $W_{MP1}$ mainly determines the width in which the write field ranges. The relation between the lengths $W_{NF}$ and $W_{MP}$ will be considered below.

Generally, the magnetic recording system using the near-field light is classified into a magnetically dominant type and a thermally dominant type. In the case of the magnetically dominant type, the width heated to reduce the coercive force $H_C$ sufficiently (heated width) is set to become larger than the width to which the write field is applied (applied width) in the recording layer of the magnetic disk. That is, the lengths $W_{NF}$ and $W_{MP}$ have a relation of $W_{NF}>W_{MP}$, and the written width (track width) becomes equivalent to the applied width. On the contrary, in the case of the thermally dominant type, the heated width is set to become the same as or smaller than the applied width. That is, the lengths $W_{NF}$ and $W_{MP}$ have a relation of $W_{NF} \leqq W_{MP}$, and the written width (track width) becomes equivalent to the heated width. In the case of the magnetically dominant type where the special resolution of a recording bit is determined by the write field, the relation of $W_{NF}>W_{MP}$ is required as the first and third embodiments shown in FIGS. 4*c* and 5*c*.

Meanwhile, in the case of the thermally dominant type shown in FIG. 6*b*, the length $W_{NF2}$ of the shorter edge on the trailing side of the generation end 63 and the length $W_{MP2}$ of the longer edge on the trailing side of the pole end 64 are set to satisfy the relation of $W_{NF2}<W_{MP2}$. Further, FIG. 6*c* also shows the case of the thermally dominant type, in which the generation end 66 has a shape of triangle with an apex on the trailing side and with a bottom on the leading side. In this case, because the neighborhood of the apex on the trailing side becomes a main heating portion, very fine recording bits can be formed. This triangular case can be considered as an extreme one that the length of the shorter edge is reduced.

As described above, by using the generation end having the trapezoidal shape with a shorter edge on the trailing side and adjusting the length of the shorter edge with relation to a longer edge of the pole end, each of the magnetically dominant and thermally dominant types can be realized appropriately. The trapezoidal shape can be surely formed with high accuracy, as shown later in FIGS. 9*a*1 to 9*f*, by applying the well-known forming method of the Abutted Junction structure for applying bias fields in a CPP-GMR effect element. As a result, the length of the generation end can be set with a desired accuracy.

Next, the alternatives to the second and fourth embodiments will be explained by using FIGS. 6*d* and 6*e*. In FIGS. 6*d* and 6*e*, the centerline 63' of the generation end 60' and the centerline 68' of the generation end 65' are offset from the centerline 64' of the pole end 61' and the centerline 69' of the pole end 66' toward the outer side of the disk when the head is opposed to the disk, respectively. The combination of the offset of the generation end and the above-described oblique configuration of the head can prevent unwanted writing and erasing to the adjacent tracks due to a skew angle of the head, as described later in detail.

In the case of the thermally dominant type shown in FIG. 6*d*, the length $W_{NF4}$ of the shorter edge on the trailing side of the generation end 60' and the length $W_{MP4}$ of the longer edge on the trailing side of the pole end 61' are set to satisfy the relation of $W_{NF4}<W_{MP4}$. Further, FIG. 6*e* also shows the case of the thermally dominant type, in which the generation end 66' has a shape of triangle with an apex on the trailing side and with a bottom on the leading side. In this case, because the neighborhood of the apex on the trailing side becomes a main heating portion, very fine recording bits can be formed. This triangular case can be considered as an extreme one that the length of the shorter edge is reduced.

Furthermore, by using the generation end having the trapezoidal shape with a shorter edge on the trailing side and adjusting the length of the shorter edge with relation to a longer edge of the pole end, each of the magnetically dominant and thermally dominant types can be realized appropriately, as is the case of FIGS. 6*a* and 6*b*.

Figure 7:
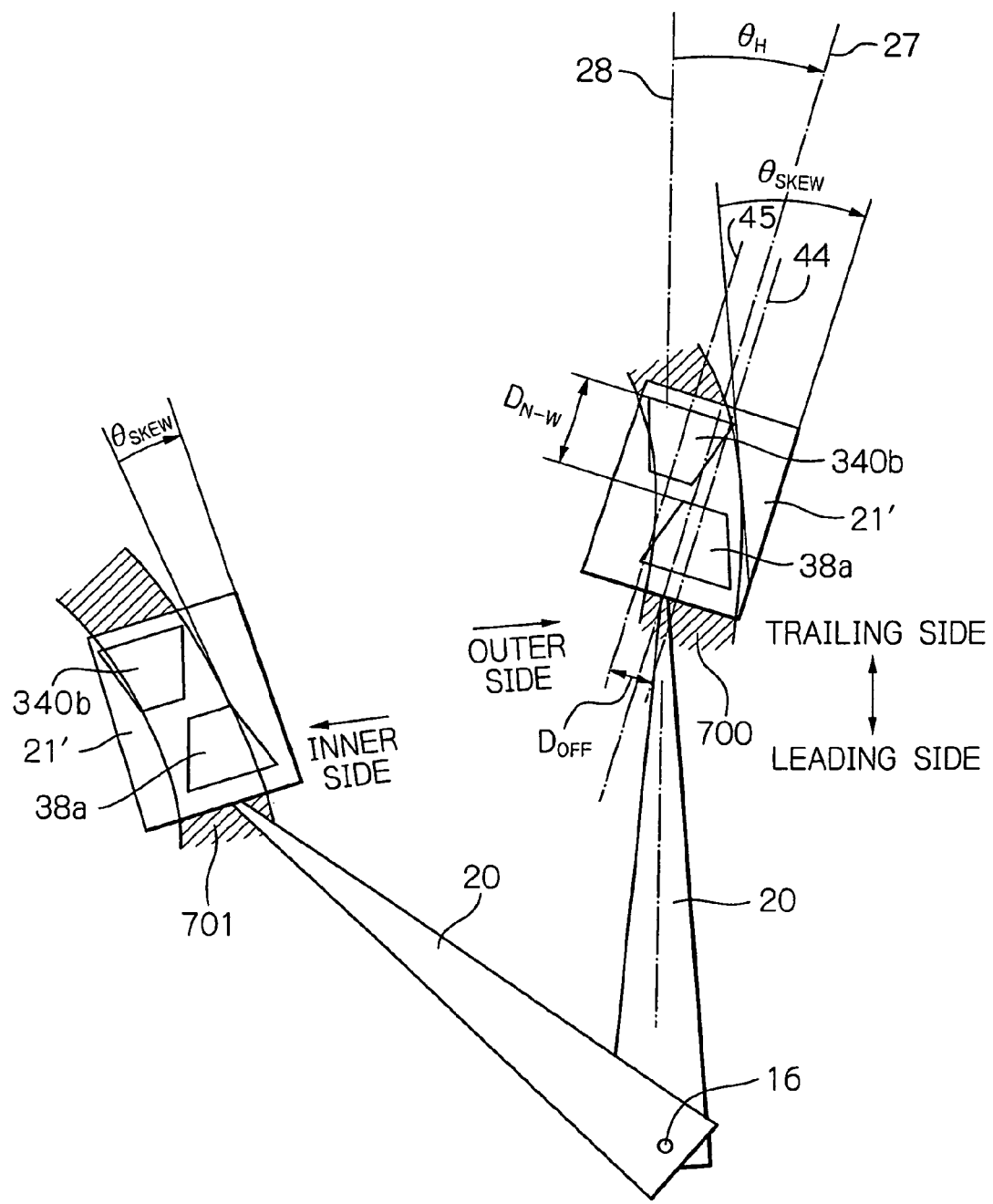
FIG. 7 shows a schematic view for explaining the effect brought by the combination of the offset of the generation end and the oblique configuration of the head, in the second and fourth embodiments.

FIG. 7 shows a schematic view for explaining the effect brought by the combination of the offset of the generation end and the oblique configuration of the head, in the second and fourth embodiments.

In the thin-film magnetic head 21' shown in FIG. 7, the centerline 44 of the generation end 38*a* is offset from the centerline 45 of the pole end 340*b* by the distance $D_{OFF}$ toward the outer side of the disk. Further, the centerline 27 of the head is oblique to the centerline 28 of the suspension 20 by an angle $\theta_H$ toward the outer side of the disk. In the figure, a skew angle $\theta_{SKEW}$ is the angle between the longitudinal direction of the head and the tangential direction of the track.

The above offset and oblique configuration enables the generation end 38*a* to fall almost into the track width that is mainly determined by the longer edge on the trailing side of the pole end 340*b*, in every case that the head 21' is positioned above the outer track 700 and above the inner track 701. Especially, the shorter edge on the trailing side that is a main heat-assisting portion can surely fall into the track width. As a result, the near-field light has almost no possibility to cover the inner and outer adjacent tracks, which can prevent an unwanted writing or erasing to the adjacent tracks due to a skew angle of the head.

In practice, the distance $D_{OFF}$, the angle $\theta_H$, the distance $D_{N\text{-}W}$ between the shorter edge of the generation end 38*a* and the longer edge of the pole end 340*b*, the position of the pivot bearing axis 16 and so on are adjusted according to the distribution of the skew angle $\theta_{SKEW}$, and then, the above-described offset and oblique configuration is determined so that the heat-assisting operation would not lower the coercive force $H_C$ in the adjacent tracks to a predetermined limit value.

FIGS. 8*a* to 8*e* show cross-sectional views explaining an embodiment of the forming process of the light acceptance cavity and the reflecting portion of the thin-film magnetic head according to the present invention.

First, as shown in FIG. 8*a*, a dielectric film 71 of, for example, $Al_2O_3$ to be a base for the reflecting portion is deposited on the slider substrate 210 by, for example, a sputtering technique, and a resist pattern 72 is formed thereon. Then, the base with a shape of the reflecting surface is formed by means of an etching such as an ion milling technique by using the resist pattern 72 as a mask. During the formation, as shown in FIG. 8*b*1, a steeper curved surface of the base is obtained when incident Ar ions 73 for milling are set in the direction with larger angle to the element-formed surface 31, that is, with a angle closer to the normal line of the element-formed surface 31. On the contrary, as shown in FIG. 8*b*2, a more gradual curved surface of the base is obtained when incident Ar ions 74 for milling are set in the direction with smaller angle to the element-formed surface 31, that is, with a angle closer to the direction within the element-formed surface 31. Therefore, the reflecting surface with a desired curvature distribution can be formed by adjusting the incident angle of Ar ions during milling.

Next, as shown in FIG. 8*c*, the reflecting portion 36 is formed on the formed curved surface of the base 75 by depositing a metal layer or an alloy layer including, for example, Au by, for example, a sputtering technique or an ion beam deposition technique. Then, as shown in FIG. 8*d*, a dielectric film of, for example, $TiO_2$ with a desired refraction index is deposited by, for example, a sputtering technique or an ion beam deposition technique, and then, the waveguide portion 37 is formed by removing the resist pattern 72, that is, by using a lift-off method. After that, the antireflection film 42 is deposited on the upper surface of the waveguide reflection portion of the waveguide portion 37 by, for example, an ion-assisted deposition technique. Next, the overcoat layer 40 is stacked so as to cover the waveguide portion 37 and the antireflection film 42 by, for example, a sputtering technique. Then, as shown in FIG. 8*e*, the light acceptance cavity 35 is formed by etching a portion of the upper surface of the overcoat layer 40 using, for example, a wet etching technique or a reactive ion etching (RIE) technique. By the successive thin-film process above-described, the light-acceptance cavity 35 and the reflecting portion 36 just below the cavity 35 can be formed with high accuracy.

FIGS. 9*a*1 to 9*f* show cross-sectional views explaining an embodiment of the forming process of the tapered portion of the waveguide linear portion and the NFL-generating portion. Here, FIGS. 9*a*2, 9*b*2, 9*c*2, 9*d*2 and 9*e*2 show cross-sections taken along line a-a, line b-b, line c-c, line d-d and line e-e in FIGS. 9*a*1, 9*b*1, 9*c*1, 9*d*1 and 9*e*1, respectively.

First, as shown in FIGS. 9*a*1 and 9*a*2, a dielectric film 81 to be an NFL-generating portion is deposited on a base 80 formed of, for example, $Al_2O_3$ by, for example, a sputtering technique, and a resist pattern 82 for lift-off is formed thereon. The dielectric film 81 is formed of, for example, $TiO_2$ with refraction index larger than that of the base 80. Then, as shown in FIGS. 9*b*1 and 9*b*2, an unwanted portion of the dielectric film 81, which is except the part beneath the resist pattern 82, is removed by, for example, an ion milling technique. After that, as shown in FIG. 9*c*1 and 9*c*2, a conductive film 83 of, for example, Au to be a side conductor layer is deposited by, for example, a sputtering technique, and then, the resist pattern 82 and the conductive film 83 thereon are removed by a lift-off technique. Then, as shown in FIGS. 9*d*1 and 9*d*2, after a resist pattern 84 is formed, unwanted portions of the dielectric film 81 and conductive film 83, which is except the part beneath the resist pattern 84, is removed by, for example, an ion milling technique. After that, as shown in FIG. 9*e*1 and 9*e*2, a back-fill dielectric film 85 of the same material as the dielectric film 81 is deposited by, for example, a sputtering technique. Then, the resist pattern 84 and the dielectric film 85 thereon are removed by a lift-off technique. Then, in the MR height process performed after the thin-film process of the head, the left-hand portion of line f-f in FIG. 9*e*2 is ground away, and thus, the line f-f becomes the head end surface on the ABS side, and the right-hand portion of the f-f line becomes the NFL-generating portion.

By repeating the above-described process, as shown in FIG. 9*f*, a plurality of waveguide layers that become sequentially larger, such as the NFL-generating portion 38, a waveguide layer 86 formed of the back-fill dielectric film 85, a waveguide layer 87, . . . , can be formed in series. These waveguide layers constitute the tapered end portion of the waveguide linear portion. Further, a covering dielectric film 88 formed of, for example, $Al_2O_3$ with refractive index smaller than that of the material of the waveguide layer is deposited. The thickness of the NFL-generating portion 38 is, for example, approximately 30 nm, the thickness of the waveguide layer 86 is, for example, approximately 60 nm, and the thickness of the waveguide layer 87 is, for example, approximately 300 nm. Further, the thickness of the base 80 and the covering dielectric film 88 is, for example, approximately 60 nm.

FIG. 10 shows a block diagram illustrating the circuit structure of the recording/reproducing and light-emission control circuit 13 of the magnetic disk drive apparatus shown in FIG. 1.

In FIG. 10, reference numeral 90 indicates a control LSI, 91 indicates a write gate for receiving recording data from the control LSI 90, 92 indicates a write circuit, 93 indicates a ROM that stores a control table and so on for controlling currents applied to the semiconductor laser oscillator 18, 95 indicates a constant current circuit for supplying sense currents to the MR effect element 33, 96 indicates an amplifier for amplifying the output voltage from the MR effect element 33, 97 indicates a demodulator circuit for outputting reproduced data to the control LSI 90, 98 indicates a temperature detector, and 99 indicates a laser control circuit for controlling the semiconductor laser oscillator 18, respectively.

The recording data that is output from the control LSI 90 is supplied to the write gate 91. The write gate 91 supplies recording data to the write circuit 92 only when a recording control signal that is output from the control LSI 90 instructs a write operation. The write circuit 92 passes write currents corresponding to this recording data through the write coil layer 342, and the electromagnetic coil element 34 writes data on the magnetic disk.

Constant currents flow from the constant current circuit 95 into the MR multilayer 332 only when the reproducing control signal that is output from the control LSI 90 instructs a read operation. The signal reproduced by this MR effect element 33 is amplified by the amplifier 96, demodulated by the demodulator circuit 97, and then, the obtained reproduced data is output to the control LSI 90.

The laser control circuit 99 receives a laser ON/OFF signal and a laser current control signal that are output from the control LSI 90. When the laser ON/OFF signal is an ON operation instruction, a current of a lasing threshold value or more flows into the semiconductor laser oscillator 18. The current value in this case is controlled to a value corresponding to the laser current control signal.

The control LSI 90 generates the laser ON/OFF signals by adjusting timing according to the write and read operations, and determines the value of the laser current control signals by referring the measured temperature values of the recording layer or the oscillator 18 with the temperature detector 98 and following the control table in the ROM 93. The control table includes data about the relation between the laser current value and the mount of temperature increase by heat-assisting in the recording layer, and data about the temperature independence of the coercive force, as well as the temperature dependence of the lasing threshold and the output vs. current characteristics of the laser oscillator. Thus, it is possible to realize not only a current application to the laser oscillator linked with the write and read operations but also a more diversified current application mode by providing the system of the laser ON/OFF signal and the laser current control signal independently from the recording/reproducing control signal system.

It is obvious that the circuit structure of the recording/reproducing and light-emission control circuit 13 is not limited to that shown in FIG. 16. It is also possible to specify the write and read operations using a signal other than a recording control signal and reproducing control signal. Furthermore, it is desirable to supply the laser oscillator 18 with powers at least during the write operation or just before the write operation, but it is also possible to supply the laser oscillator 18 with powers continuously during a predetermined period in which read and write operations continue.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head comprising:
   a substrate having an opposed-to-medium surface and an element-formed surface perpendicular to said opposed-to-medium surface;
   an electromagnetic coil element for writing data signals, formed on/above said element-formed surface, and having a main magnetic pole layer, a pole end of said main magnetic pole layer reaching a head end surface on the side of said opposed-to-medium surface; and
   a near-field-light-generating portion for heating a portion of a magnetic recording medium during write operation with a near-field light generated by a uniform vibration of electric dipoles or free electrons in said near-field-light-generating portion, formed on/above said element-formed surface, and having a generation end reaching said head end surface,
   a shape of said generation end on said head end surface being a trapezoid with a shorter edge on the trailing side, or being a triangle with an apex on the trailing side and with a bottom on the leading side, and
   said shorter edge or said apex being provided adjacent to said pole end and on the leading side of said pole end, and a neighborhood of said shorter edge or said apex acting as a main heating portion emitting a strongest near-field light.

2. The thin-film magnetic head as claimed in claim 1, wherein a shape of said pole end on said head end surface is a trapezoid with a longer edge on the trailing side, and a length of said shorter edge of said generation end is longer than a length of said longer edge of said pole end.

3. The thin-film magnetic head as claimed in claim 1, wherein a waveguide portion including a light path of a light applied to said near-field-light-generating portion is provided, and said near-field-light-generating portion has a contact with an end on said opposed-to-medium surface side of said waveguide portion.

4. The thin-film magnetic head as claimed in claim 3, wherein a magnetoresistive effect element for reading data signals having an end reaching said head end surface is formed on/above said element-formed surface, and said waveguide portion and said near-field-light-generating portion are provided between said magnetoresistive effect element and said electromagnetic coil element.

5. The thin-film magnetic head as claimed in claim 3, wherein an overcoat layer is formed on said element-formed surface so as to cover said electromagnetic coil element, said waveguide portion and said near-field-light-generating portion, and said waveguide portion is formed of a dielectric material with a refractive index larger than that of a constituent material of said overcoat layer.

6. The thin-film magnetic head as claimed in claim 5, wherein a portion near said head end surface of said waveguide portion is tapered toward said head end surface, and said near-field-light-generating portion is formed of the same material as said waveguide portion, and side conductor layers formed of a conductive material are provided so as to contact with both side ends in the track width direction of said near-field-light-generating portion and with both side ends in the track width direction of the tapered portion of said waveguide portion.

7. The thin-film magnetic head as claimed in claim 3, wherein said near-field-light-generating portion is a metal layer or a dielectric layer with a shape tapered toward said head end surface, and is sloped in respect to said element-formed surface in the form that a portion in said head end surface side is lifted up or pulled down, and has a light-received surface for receiving a light to generate a near-field light, and said light-received surface has a contact with an end surface on said opposed-to-medium surface side of said waveguide portion.

8. The thin-film magnetic head as claimed in claim 1, wherein, on said head end surface, a centerline perpendicular or almost perpendicular to the track width direction of said generation end is offset from a centerline perpendicular or almost perpendicular to the track width direction of said pole end.

9. The thin-film magnetic head as claimed in claim 8, wherein said centerline of said generation end is offset from said centerline of said pole end toward the outer side of said magnetic recording medium when said thin-film magnetic head is opposed to said magnetic recording medium.

10. A head gimbal assembly comprising:
a thin-film magnetic head comprising:
  a substrate having an opposed-to-medium surface and an element-formed surface perpendicular to said opposed-to-medium surface;
  an electromagnetic coil element for writing data signals, formed on/above said element-formed surface, and having a main magnetic pole layer, a pole end of said main magnetic pole layer reaching a head end surface on the side of said opposed-to-medium surface; and
  a near-field-light-generating portion for heating a portion of a magnetic recording medium during write operation with a near-field light generated by a uniform vibration of electric dipoles or free electrons in said near-field-light-generating portion, formed on/above said element-formed surface, and having a generation end reaching said head end surface,
  a shape of said generation end on said head end surface being a trapezoid with a shorter edge on the trailing side, or being a triangle with an apex on the trailing side and with a bottom on the leading side, and
  said shorter edge or said apex being provided adjacent to said pole end and on the leading side of said pole end, and a neighborhood of said shorter edge or said apex acting as a main heating portion emitting a strongest near-field light;
a support mechanism for supporting said thin-film magnetic head;
trace conductors for said electromagnetic coil element;
trace conductors for a magnetoresistive effect element when said thin-film magnetic head comprises said magnetoresistive effect element; and
an optic fiber for applying a light to said near-field-light-generating portion.

11. The head gimbal assembly as claimed in claim 10, wherein a shape of said pole end on said head end surface is a trapezoid with a longer edge on the trailing side, and a length of said shorter edge of said generation end is longer than a length of said longer edge of said pole end.

12. The head gimbal assembly as claimed in claim 10, wherein a waveguide portion including a light path of a light applied to said near-field-light-generating portion is provided, and said near-field-light-generating portion has a contact with an end on said opposed-to-medium surface side of said waveguide portion.

13. The head gimbal assembly as claimed in claim 12, wherein a magnetoresistive effect element for reading data signals having an end reaching said head end surface is formed on/above said element-formed surface, and said waveguide portion and said near-field-light-generating portion are provided between said magnetoresistive effect element and said electromagnetic coil element.

14. The head gimbal assembly as claimed in claim 12, wherein an overcoat layer is formed on said element-formed surface so as to cover said electromagnetic coil element, said waveguide portion and said near-field-light-generating portion, and said waveguide portion is formed of a dielectric material with a refractive index larger than that of a constituent material of said overcoat layer.

15. The head gimbal assembly as claimed in claim 14, wherein a portion near said head end surface of said waveguide portion is tapered toward said head end surface, and said near-field-light-generating portion is formed of the same material as said waveguide portion, and side conductor layers formed of a conductive material are provided so as to contact with both side ends in the track width direction of said near-field-light-generating portion and with both side ends in the track width direction of the tapered portion of said waveguide portion.

16. The head gimbal assembly as claimed in claim 12, wherein said near-field-light-generating portion is a metal layer or a dielectric layer with a shape tapered toward said head end surface, and is sloped in respect to said element-formed surface in the form that a portion in said head end surface side is lifted up or pulled down, and has a light-received surface for receiving a light to generate a near-field light, and said light-received surface has a contact with an end surface on said opposed-to-medium surface side of said waveguide portion.

17. The head gimbal assembly as claimed in claim 10, wherein, on said head end surface, a centerline perpendicular or almost perpendicular to the track width direction of said generation end is offset from a centerline perpendicular or almost perpendicular to the track width direction of said pole end.

18. The head gimbal assembly as claimed in claim 17, wherein said centerline of said generation end is offset from said centerline of said pole end toward the outer side of said magnetic recording medium when said thin-film magnetic head is opposed to said magnetic recording medium.

19. The head gimbal assembly as claimed in claim 10, wherein said thin-film magnetic head is fixed on said supporting mechanism in such a way that a centerline of said thin-film magnetic head perpendicular or almost perpendicular to the track width direction becomes oblique to a centerline of said supporting mechanism in the longitudinal direction.

20. The head gimbal assembly as claimed in claim 19, wherein a trailing side of said centerline of said thin-film magnetic head is directed away from said centerline of said supporting mechanism toward the outer side of said magnetic recording medium when being opposed to said magnetic recording medium.

21. A magnetic recording apparatus comprising:
at least one head gimbal assembly comprising:
a thin-film magnetic head comprising:
  a substrate having an opposed-to-medium surface and an element-formed surface perpendicular to said opposed-to-medium surface;
  an electromagnetic coil element for writing data signals, formed on/above said element-formed surface, and having a main magnetic pole layer, a pole end of said main magnetic pole layer reaching a head end surface on the side of said opposed-to-medium surface; and
  a near-field-light-generating portion for heating a portion of a magnetic recording medium during write operation with a near-field light generated by a uniform vibration of electric dipoles or free electrons in said near-field-light-generating portion, formed on/above said element-formed surface, and having a generation end reaching said head end surface,
  a shape of said generation end on said head end surface being a trapezoid with a shorter edge on the trailing side, or being a triangle with an apex on the trailing side and with a bottom on the leading side, and
  said shorter edge or said apex being provided adjacent to said pole end and on the leading side of said pole end, and a neighborhood of said shorter edge or said apex acting as a main heating portion emitting a strongest near-field light;

a support mechanism for supporting said thin-film magnetic head;

trace conductors for said electromagnetic coil element;

trace conductors for a magnetoresistive effect element when said thin-film magnetic head comprises said magnetoresistive effect element; and an optic fiber for applying a light to said near-field-light-generating portion;

at least one magnetic recording medium;

a light source for providing a light through said optic fiber; and a recording/reproducing and light-emission control means for controlling read and write operations of said thin-film magnetic head to said magnetic recording medium and for controlling an emitting operation of said light source.

22. The magnetic recording apparatus as claimed in claim 21, wherein a shape of said pole end on said head end surface is a trapezoid with a longer edge on the trailing side, and a length of said shorter edge of said generation end is longer than a length of said longer edge of said pole end.

23. The magnetic recording apparatus as claimed in claim 21, wherein a waveguide portion including a light path of a light applied to said near-field-light-generating portion is provided, and said near-field-light-generating portion has a contact with an end on said opposed-to-medium surface side of said waveguide portion.

24. The magnetic recording apparatus as claimed in claim 23, wherein a magnetoresistive effect element for reading data signals having an end reaching said head end surface is formed on/above said element-formed surface, and said waveguide portion and said near-field-light-generating portion are provided between said magnetoresistive effect element and said electromagnetic coil element.

25. The magnetic recording apparatus as claimed in claim 23, wherein an overcoat layer is formed on said element-formed surface so as to cover said electromagnetic coil element, said waveguide portion and said near-field-light-generating portion, and said waveguide portion is formed of a dielectric material with a refractive index larger than that of a constituent material of said overcoat layer.

26. The magnetic recording apparatus as claimed in claim 25, wherein a portion near said head end surface of said waveguide portion is tapered toward said head end surface, and said near-field-light-generating portion is formed of the same material as said waveguide portion, and side conductor layers formed of a conductive material are provided so as to contact with both side ends in the track width direction of said near-field-light-generating portion and with both side ends in the track width direction of the tapered portion of said waveguide portion.

27. The magnetic recording apparatus as claimed in claim 23, wherein said near-field-light-generating portion is a metal layer or a dielectric layer with a shape tapered toward said head end surface, and is sloped in respect to said element-formed surface in the form that a portion in said head end surface side is lifted up or pulled down, and has a light-received surface for receiving a light to generate a near-field light, and said light-received surface has a contact with an end surface on said opposed-to-medium surface side of said waveguide portion.

28. The magnetic recording apparatus as claimed in claim 21, wherein, on said head end surface, a centerline perpendicular or almost perpendicular to the track width direction of said generation end is offset from a centerline perpendicular or almost perpendicular to the track width direction of said pole end.

29. The magnetic recording apparatus as claimed in claim 28, wherein said centerline of said generation end is offset from said centerline of said pole end toward the outer side of said magnetic recording medium when said thin-film magnetic head is opposed to said magnetic recording medium.

30. The magnetic recording apparatus as claimed in claim 21, wherein said thin-film magnetic head is fixed on said supporting mechanism in such a way that a centerline of said thin-film magnetic head perpendicular or almost perpendicular to the track width direction becomes oblique to a centerline of said supporting mechanism in the longitudinal direction.

31. The magnetic recording apparatus as claimed in claim 30, wherein a trailing side of said centerline of said thin-film magnetic head is directed away from said centerline of said supporting mechanism toward the outer side of said magnetic recording medium when being opposed to said magnetic recording medium.

* * * * *